US011611424B2

(12) United States Patent
Raghavan et al.

(10) Patent No.: US 11,611,424 B2
(45) Date of Patent: Mar. 21, 2023

(54) SLOT FORMAT INDICATOR (SFI) AND BEAM INFORMATION EXCHANGE IN A DYNAMIC TIME DIVISION DUPLEX (TDD) SCHEME WITH CARRIER AGGREGATION ACROSS MILLIMETER WAVE BANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US); Alexander Dorosenco, El Cajon, CA (US); Robert Douglas, San Diego, CA (US); Jeremy Darren Dunworth, La Jolla, CA (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/142,194

(22) Filed: Jan. 5, 2021

(65) Prior Publication Data

US 2021/0258133 A1 Aug. 19, 2021

Related U.S. Application Data

(60) Provisional application No. 62/978,779, filed on Feb. 19, 2020.

(51) Int. Cl.
*H04L 5/14* (2006.01)
*H04W 72/044* (2023.01)
*H04W 72/04* (2023.01)

(52) U.S. Cl.
CPC ......... *H04L 5/1461* (2013.01); *H04W 72/044* (2013.01); *H04W 72/048* (2013.01)

(58) Field of Classification Search
None
See application file for complete search history.

(56) References Cited

U.S. PATENT DOCUMENTS 10,985,898 B2 * 4/2021 Kim .................. H04L 5/0048
2010/0195527 A1 * 8/2010 Gorokhov ............ H04B 7/0417
370/252

(Continued)

OTHER PUBLICATIONS

Huawei et al., "Discussion on UE Behavior Mixed Numerology Carrier", 3GPP TSG RAN WG1 Meeting #86bis, 3GPP Draft, R1-1609425, 3rd Generation Partnership Project (3GPP), Mobile Competence Centre, 650, Route Des Lucioles, F-06921 Sophia-Antipolis Cedex, France, vol. RAN WG1, No. Lisbon , Portugal, Oct. 10-14, 2016, Oct. 9, 2016 (Oct. 9, 2016), XP051149468, 4 Pages, Retrieved from the Internet: URL: https://www.3gpp.org/ftp/TSG_RAN/WG1_RL1/TSGR1_86b/Docs/R1-1609425.zip, [retrieved on Oct. 9, 2016], p. 3, Lines 32-35.

(Continued)

*Primary Examiner* — Otis L Thompson, Jr.
(74) *Attorney, Agent, or Firm* — Loza & Loza, LLP/Qualcomm

(57) ABSTRACT

Aspects of the disclosure relate to an apparatus (e.g., a user equipment (UE)) configured to operate in a full-duplex mode. The apparatus may include at least one transmit chain configured to operate within a first frequency band and at least one receive chain configured to operate within a second frequency band. The apparatus may receive coordination information that is configured to mitigate the self-interference between the at least one transmit chain of the apparatus and the at least one receive chain of the apparatus. In some examples, the received coordination information includes at least one of subcarrier spacing coordination information, beam coordination information, or slot format index coordination information. In some examples, the apparatus may (Continued)

transmit a first signal while receiving a second signal based on at least the subcarrier spacing coordination information, the beam coordination information, or the slot format index coordination information to mitigate self-interference.

27 Claims, 23 Drawing Sheets

(56) References Cited

U.S. PATENT DOCUMENTS

| | | | | |
|---|---|---|---|---|
| 2016/0127108 | A1* | 5/2016 | Jindal | H04W 72/0453 |
| | | | | 370/281 |
| 2018/0376476 | A1* | 12/2018 | Lee | H04L 5/001 |
| 2019/0098626 | A1* | 3/2019 | Yi | H04W 72/0446 |
| 2019/0140811 | A1 | 5/2019 | Abedini et al. | |
| 2021/0250158 | A1* | 8/2021 | Gulati | H04L 5/0062 |
| 2021/0258133 | A1* | 8/2021 | Raghavan | H04J 11/0023 |
| 2021/0337582 | A1* | 10/2021 | Kuang | H04W 72/1289 |
| 2022/0046553 | A1* | 2/2022 | Kim | H04W 72/082 |

OTHER PUBLICATIONS

International Search Report and Written Opinion—PCT/US2021/012375—ISA/EPO—dated Apr. 28, 2021.
Vivo: "Remaining Issues on UE Self-Interference Handling", 3GPP TSG RAN WG1 Meeting #90bis, 3GPP Draft, R1-1717507 Remaining Issues on UE Self-Interference Handling, 3rd Generation Partnership Project (3GPP), Mobile Competence Centre, 650, Route Des Lucioles, F-06921 Sophia-Antipolis Cedex, vol. RAN WG1, No. Prague, Czech Republic, 20171099-Oct. 13, 2017, Oct. 8, 2017 (Oct. 8, 2017), pp. 1-5, XP051340694, Retrieved from the Internet: URL: https://www.3gpp.org/ftp/TSG_RAN/WG1_RL1/TSGR1_90b/Docs/R1-1717507.zip, [retrieved on Oct. 8, 2017], Section 1, Section 2.3.
ZTE: "Coexistence of LTE-MTC with NR", 3GPP TSG RAN WG1 Meeting #94, 3GPP Draft, R1-1808634 MTC Coexistence with NR, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 10, 2018 (Aug. 10, 2018), 4 Pages, XP051516010, Retrieved from the Internet: URL: https://www.3gpp.org/ftp/tsg_ran/wg1_rL1/TSGR1_94/Docs/R1-1808634.zip, [retrieved on Aug. 10, 2018], p. 3, Lines 7-9.

* cited by examiner

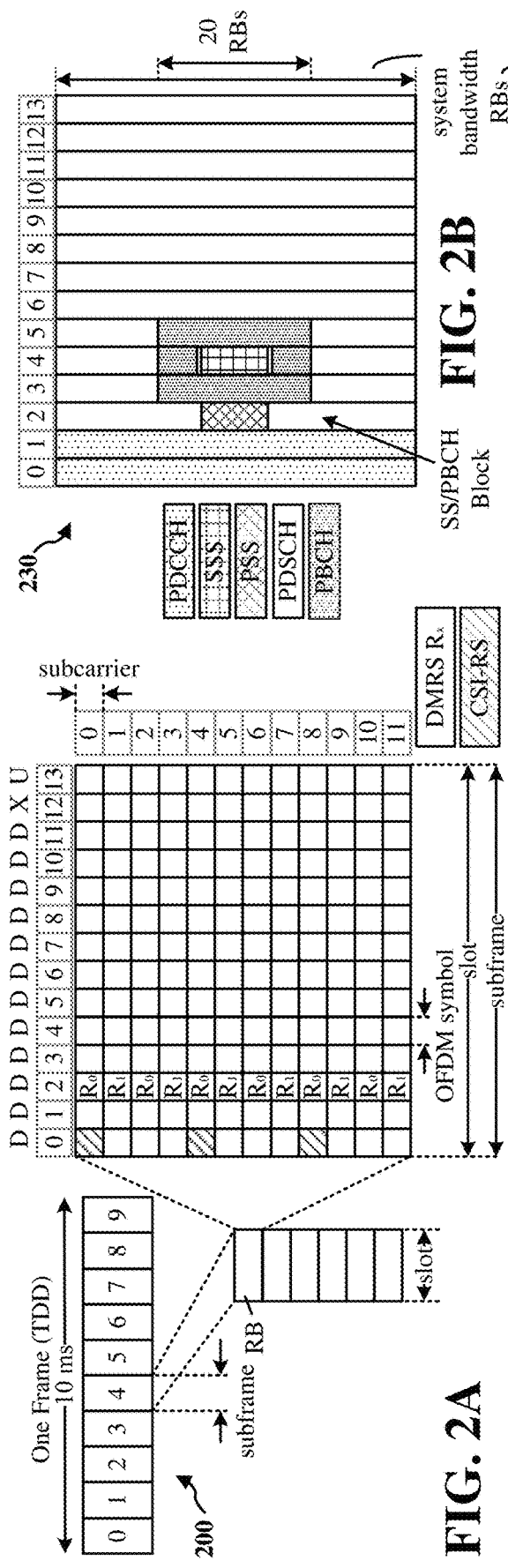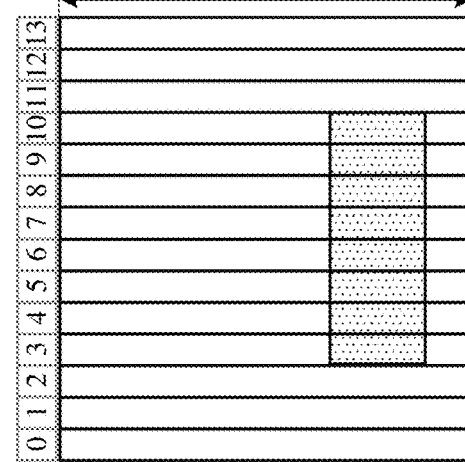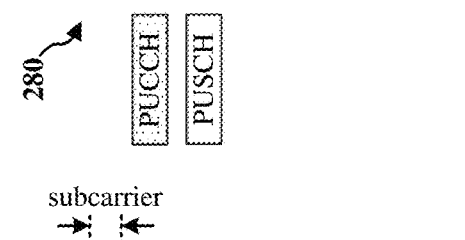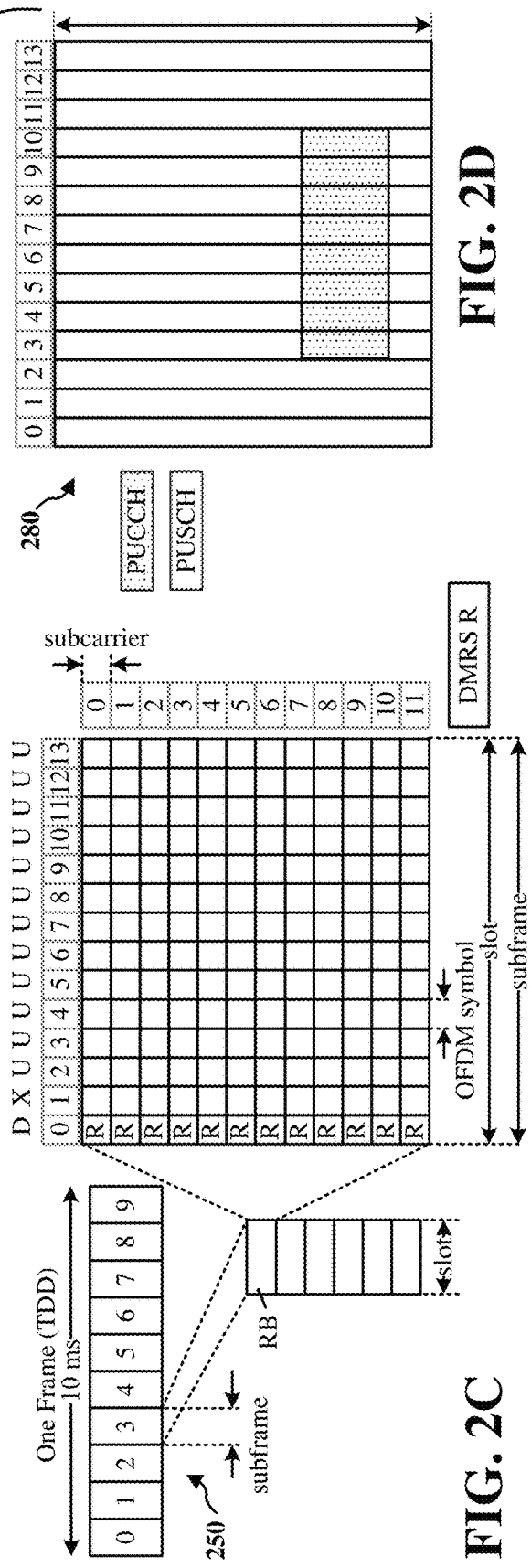

SLOT FORMAT INDICATOR (SFI) AND BEAM INFORMATION EXCHANGE IN A DYNAMIC TIME DIVISION DUPLEX (TDD) SCHEME WITH CARRIER AGGREGATION ACROSS MILLIMETER WAVE BANDS

CROSS REFERENCE TO RELATED APPLICATION

This application claims the benefit of U.S. Provisional Application Ser. No. 62/978,779, entitled "SLOT FORMAT INDICATOR (SFI) AND BEAM INFORMATION EXCHANGE IN A DYNAMIC TIME DIVISION DUPLEX (TDD) SCHEME WITH CARRIER AGGREGATION ACROSS MILLIMETER WAVE BANDS" and filed on Feb. 19, 2020, which is expressly incorporated by reference herein in its entirety.

BACKGROUND

Technical Field

The present disclosure relates generally to communication systems, and more particularly, to methods for slot format indicator (SFI) and beam information exchange in a dynamic time division duplex (TDD) scheme with carrier aggregation across millimeter wave bands.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An apparatus in a wireless communication network (e.g., a base station, a user equipments (UE), etc.) communicating in full-duplex (FD) mode may transit signals from a transmitter element while concurrently receiving signals at a receiver element. In some wireless communication networks, the apparatus may transit signals from the transmitter element using at least one transmit chain of the apparatus and may receive signals at the receiver element using at least one receive chain of the apparatus. The at least one transmit chain may be configured to operate within a first frequency band and the at least one receive chain may be configured to operate within a second frequency band. However, the signals transmitted from the transmitter element may reflect off of objects (e.g., structures, trees, cars, etc.) in the wireless communication network and may cause interference (also referred to as self-interference) to signals received at the receiver element. The aspects described herein may mitigate such self-interference at an apparatus operating in full-duplex (FD) mode.

In an aspect of the disclosure, a method, a computer-readable medium, and an apparatus are provided. The apparatus may be a user equipment (UE) configured for full-duplex communication having at least one transmit chain and at least one receive chain. The at least one transmit chain is configured to operate within a first frequency band and the at least one receive chain is configured to operate within a second frequency band. The apparatus transmits capability information to a network, the capability information indicating capabilities of the UE for hardware-based self-interference mitigation between the at least one transmit chain and the at least one receive chain. The apparatus receives for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information are configured to mitigate the self-interference between the at least one transmit chain of the UE and the at least one receive chain of the UE. The apparatus transmits a first signal while receiving a second signal based on at least the subcarrier spacing coordination information, the beam coordination information, or the slot format index coordination information.

In an aspect of the disclosure, a method, a computer-readable medium, and an apparatus are provided. The apparatus may be a user equipment (UE) configured for full-duplex communication. The apparatus determines capability information indicating any capabilities of the apparatus for hardware-based self-interference mitigation between at least one transmit chain of the apparatus and at least one receive chain of the apparatus, wherein the at least one transmit chain is configured to operate within a first frequency band and the at least one receive chain is configured to operate within a second frequency band. The apparatus transmits the capability information to a network. The apparatus receives for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information are configured to mitigate the self-interference between the at least one transmit chain of the apparatus and the at least one receive chain of the apparatus. The apparatus transmits a first signal while receiving a second signal based on at least the subcarrier spacing coordination information, the beam coordination information, or the slot format index coordination information.

In an aspect of the disclosure, a method, a computer-readable medium, and an apparatus are provided. The apparatus may be a user equipment (UE) configured for full-duplex communication. The apparatus receives subcarrier spacing (SCS) coordination information, the SCS coordination information including a first SCS configuration for a first frequency band allocated for signal transmissions from the apparatus, and a second SCS configuration for a second frequency band allocated for signal receptions at the apparatus, wherein the first and second frequency bands are nonoverlapping. The apparatus transmits a first signal based on the first SCS configuration while receiving a second signal based on the second SCS configuration, wherein the first SCS configuration and the second SCS configuration mitigate interference between the first and second signals.

In an aspect of the disclosure, a method, a computer-readable medium, and an apparatus are provided. The apparatus may be a user equipment (UE) configured for full-duplex communication. The apparatus receives at least one of beam coordination information for a first beam in a first frequency band and for a second beam in a second frequency band, the first and second frequency bands being nonoverlapping, wherein the beam coordination information indicates that the second beam is to be formed based on a configuration of the first beam to mitigate interference between the first and second beams, and slot format index coordination information for the first and second frequency bands, wherein the slot format index coordination information indicates a first slot format index for the first frequency band and a second slot format index for the second frequency band, wherein the first and second slot format indices are configured to mitigate the interference between the first and second beams. The apparatus transmits with the first beam while receiving with the second beam based on at least the beam coordination information or the slot format index coordination information.

In an aspect of the disclosure, a method, a computer-readable medium, and an apparatus are provided. The apparatus may be a base station configured for full-duplex communication. The apparatus receives, from a user equipment (UE) configured for full-duplex communication, capability information indicating any capabilities of the UE for hardware-based self-interference mitigation between at least one transmit chain of the UE and at least one receive chain of the UE, wherein the at least one transmit chain is configured to operate within a first frequency band and the at least one receive chain is configured to operate within a second frequency band. The apparatus determines at least subcarrier spacing coordination information, beam coordination information, or slot format index coordination information for the first and second frequency bands based on the capability information, wherein each of the subcarrier spacing coordination information, the beam coordination information, and the slot format index coordination information are configured to mitigate the self-interference between the at least one transmit chain of the UE and the at least one receive chain of the UE. The apparatus transmits at least the subcarrier spacing coordination information, beam coordination information, or slot format index coordination information to the UE.

In an aspect of the disclosure, a method, a computer-readable medium, and an apparatus are provided. The apparatus may be a base station configured for full-duplex communication. The apparatus transmits, to a user equipment (UE) configured for full-duplex communication, subcarrier spacing (SCS) coordination information, the SCS coordination information including a first SCS configuration for a first frequency band allocated for signal transmissions from the UE, and a second SCS configuration for a second frequency band allocated for signal receptions at the UE, wherein the first and second frequency bands are nonoverlapping. The apparatus receives a first signal based on the first SCS configuration while transmitting a second signal based on the second SCS configuration, wherein the first SCS configuration and the second SCS configuration mitigate interference between the first and second signals at the UE.

In an aspect of the disclosure, a method, a computer-readable medium, and an apparatus are provided. The apparatus may be a base station configured for full-duplex communication. The apparatus determines, for a user equipment (UE) configured for full-duplex communication, at least one of beam coordination information for a first beam in a first frequency band of the UE and for a second beam in a second frequency band of the UE, the first and second frequency bands being nonoverlapping, wherein the beam coordination information indicates that the second beam is to be formed at the UE based on a configuration of the first beam to mitigate interference between the first and second beams of the UE, and slot format index coordination information for the first and second frequency bands of the UE, wherein the slot format index coordination information indicates a first slot format index for the first frequency band and a second slot format index for the second frequency band, wherein the first and second slot format indices are configured to mitigate the interference between the first and second beams of the UE. The apparatus transmits, to the UE, at least the beam coordination information or the slot format index coordination information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
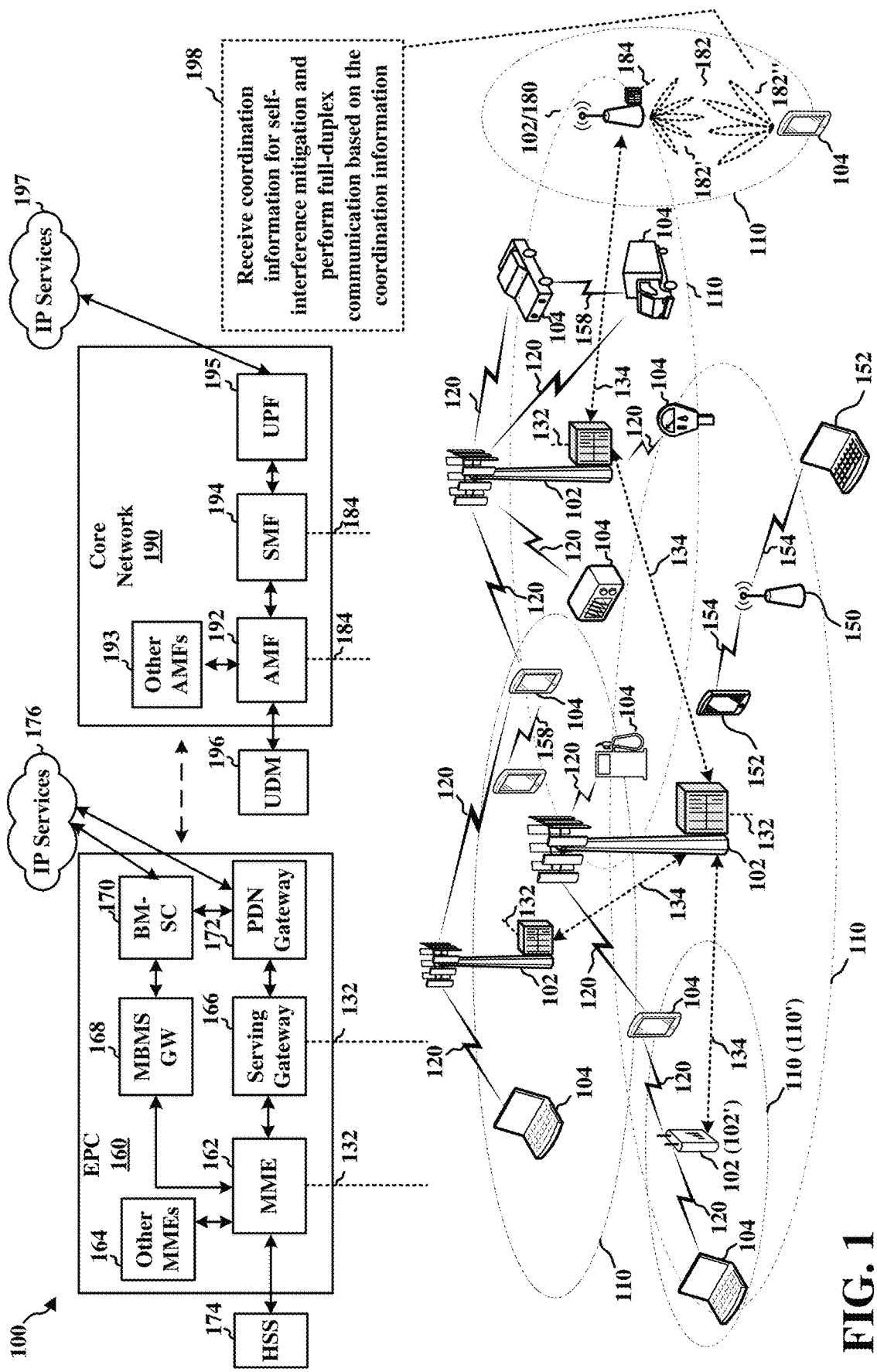
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive coordination information for self-interference mitigation and perform full-duplex communication based on the coordination information 198.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may implement a frequency division duplex (FDD) scheme in which for a particular set of subcarriers (carrier system bandwidth), subframes within the set of subcarriers are dedicated for either DL or UL, or may implement a time division duplex (TDD) scheme in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). In the description herein, the term slot format indicator is also referred to as a slot format indication. Accordingly, the terms slot format indicator and slot format indication are used interchangeably herein and abbreviated as SFI. Note that the description infra applies also to a 5G/NR frame structure that is TDD.

In the aspects described herein, the SFI may be a slot format index (also referred to as an SFI index) that is associated with a unique slot format. A slot format may define portions of a slot that may be used for uplink or downlink. The slot format index may be an integer. For example, a slot format index 0 may indicate a first slot format, a slot format index 1 may indicate a second slot format, a slot format index 2 may indicate a third slot format, and so on.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
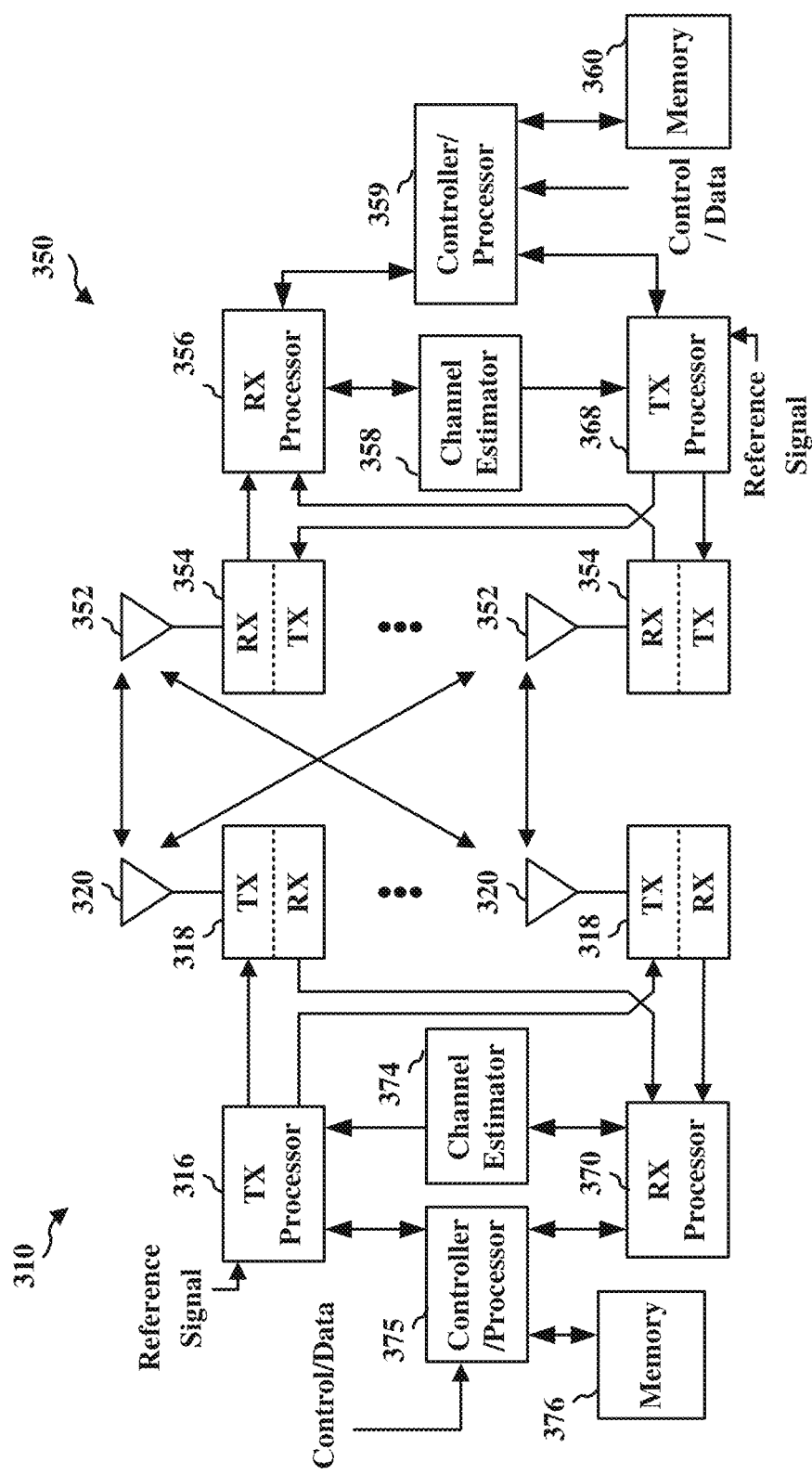
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with coordination information for self-interference mitigation 198 of FIG. 1.

Figure 4:
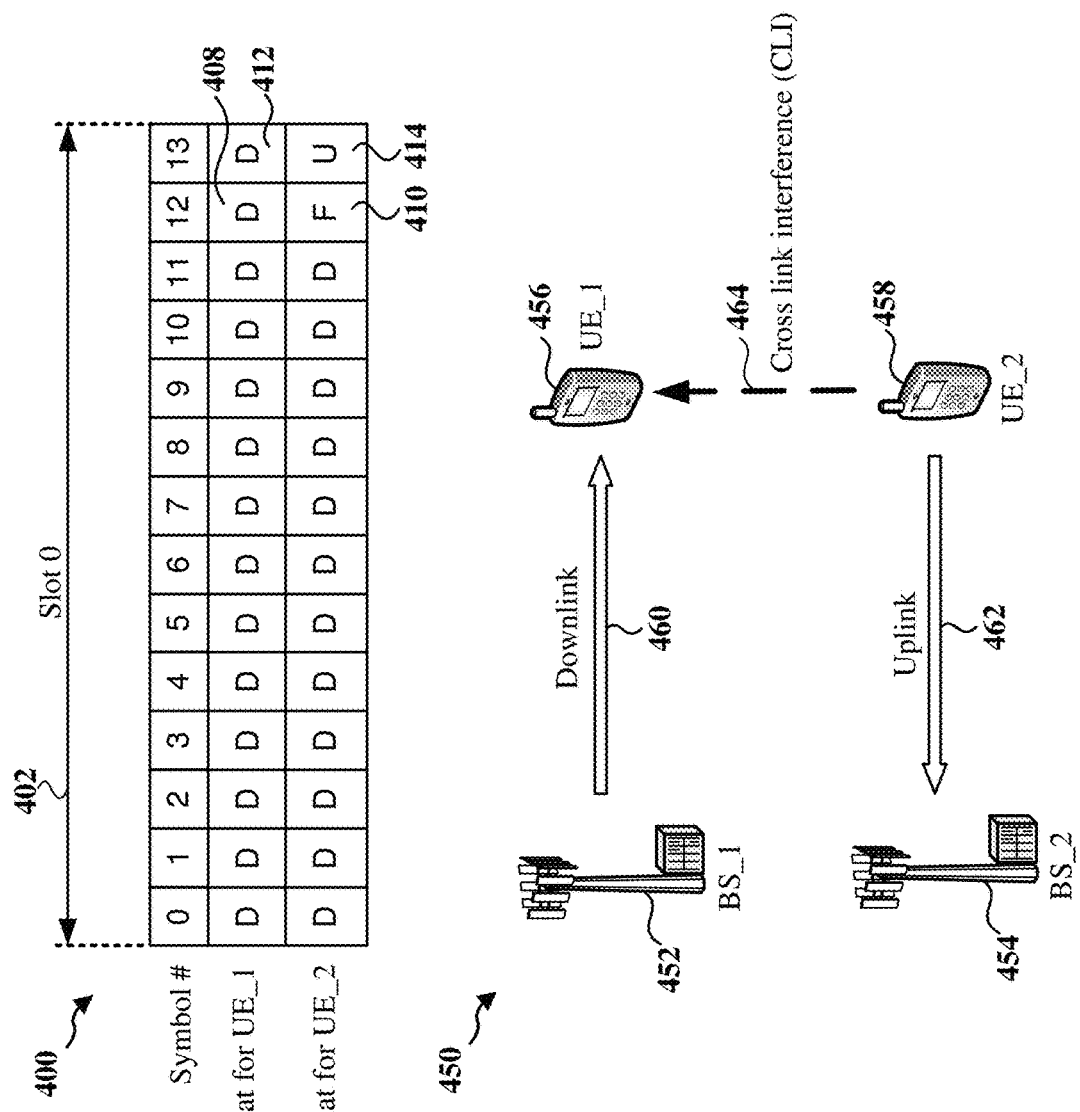
FIG. 4 illustrates an example scenario where one UE may cause cross-link interference (CLI) to another UE in a wireless communication network.

FIG. 4 illustrates an example scenario where one UE (e.g., UE_2 458) may cause cross-link interference (CLI) to another UE (e.g., UE_1 456) in a wireless communication network (e.g., wireless communication network 450). For example, a 5G NR network may implement a flexible transmission scheme, such as a time division duplex (TDD) scheme, for communication with UEs in the 5G NR network. TDD may allow the 5G NR network to dynamically define which symbols within a slot of a subframe are to be used for downlink (DL) transmissions and which symbols within the slot of the subframe are to be used for uplink (UL) transmissions. For example, a unique arrangement of DL symbols, UL symbols, and flexible (F) symbols may be associated with a unique slot format indicator (SFI). For example the unique slot format indicator (SFI) may be a unique SFI index value. A flexible symbol may be used as a DL symbol, a UL symbol, or as a gap symbol for a DL to UL transition or for a UL to DL transition. In some example implementations, a 5G NR network may use an 8-bit SFI value (e.g., an 8-bit SFI index) to configure a UE with one of a number of predefined slot formats (e.g., one of 56 predefined slot formats).

For maximum flexibility in terms of subframe structure, different UEs in a 5G NR network may be in either downlink mode or uplink mode depending on instantaneous traffic load. However, some UEs performing UL transmissions during certain time periods (e.g., during certain symbols within a time slot of a subframe) may interfere with other UEs receiving DL transmissions during those time periods. This interference may be referred to as cross-link interference (CLI). Therefore, there may be a tradeoff between flexible transmissions and an increase in CLI.

FIG. 4 shows an example TDD configuration 400 that may be applied at an example 5G NR network 450. As shown in FIG. 4, the 5G NR network 450 includes a first base station (BS_1) 452, a second base station (BS_2) 454, a first UE (UE_1) 456, and a second UE (UE_2) 458. As shown in the example TDD configuration 400 of FIG. 4, a time slot (e.g., slot 0 402) of a subframe may include 14 symbols (e.g., symbol #0 to symbol #13) with a normal cyclic prefix (CP). The UE_1 456 may be assigned a first slot format that configures each symbol in the slot #0 402 as a DL symbol. The UE_2 458 may be assigned a second slot format that configures the first 12 symbols (e.g., symbol #0 to symbol #11) as DL symbols, the thirteenth symbol (e.g., symbol #12 410) as a flexible (F) symbol, and the fourteenth symbol (e.g., symbol #13 414) as a UL symbol.

With reference to the example TDD configuration 400 of FIG. 4, if the flexible symbol #12 410 of the slot format for the UE_2 458 is used as a DL symbol, then symbol #12 408 of the slot format for the UE_1 456 and symbol #12 410 of the slot format for the UE_2 458 may both be DL symbols. In this scenario, since both the UE_1 456 and the UE_2 458 in the 5G NR network 450 are configured to receive a downlink signal, neither the UE_1 456 nor the UE_2 458 may experience CLI. However, during the fourteenth symbol (e.g., symbol #13), when the UE_2 458 transmits the uplink signal 462 (e.g., during the UL symbol 414) and the UE_1 456 receives the downlink signal 460 (e.g., during the DL symbol 412), the transmission of the uplink signal 462 from the UE_2 458 may cause CLI 464 to the UE_1 456. The CLI 464 shown in FIG. 4 is an example of inter-UE CLI.

Figure 5:
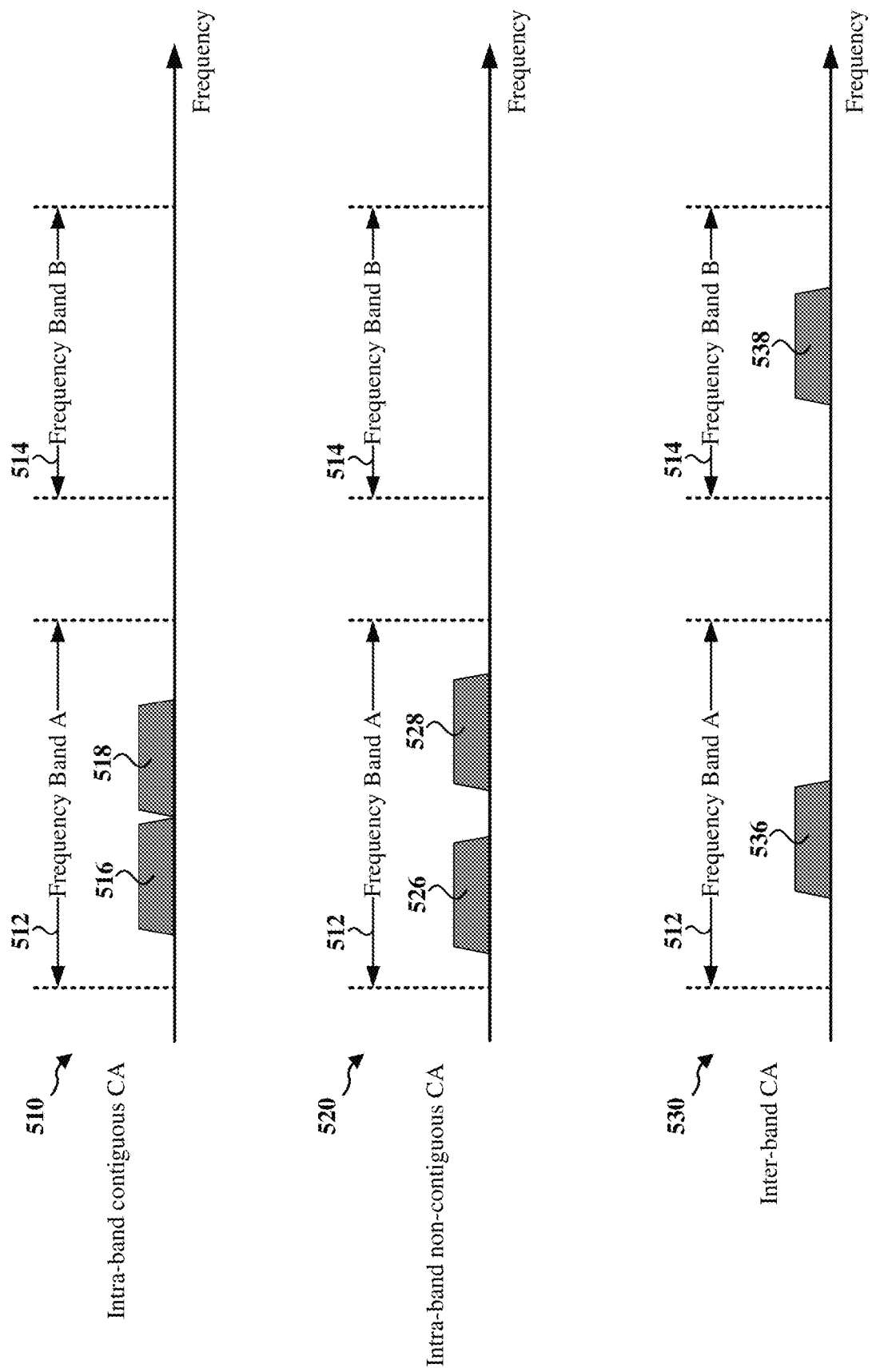
FIG. 5 includes example frequency band configurations for carrier aggregation (CA) systems.

FIG. 5 includes example frequency band configurations 510, 520, 530 for carrier aggregation (CA) systems. The increase in bandwidth provided by CA systems may enable increased data rates, diversity, and improved performance. CA may be implemented using either intra-band aggregation or inter-band aggregation.

In FIG. 5, the frequency band configuration 510 is an example of intra-band contiguous CA where two contiguous component carriers 516, 518 are within the same frequency band A 512. The frequency band configuration 520 is an example of intra-band non-contiguous CA where two non-contiguous component carriers 526, 528 are within the same frequency band A 512. The frequency band configuration 530 is an example of inter-band CA where the component carrier 536 is within the frequency band A 512 and the component carrier 538 is within the frequency band B 514.

Figure 6B:
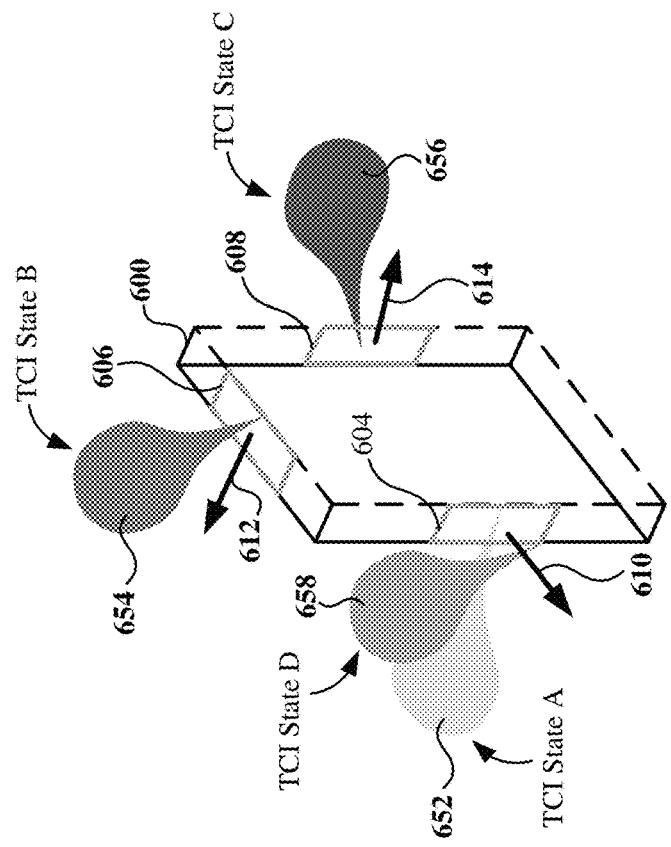
FIG. 6 (including FIGS. 6A and 6B) illustrates example beams formed at a UE when communicating with different base stations in a 5G NR network.
Figure 6A:
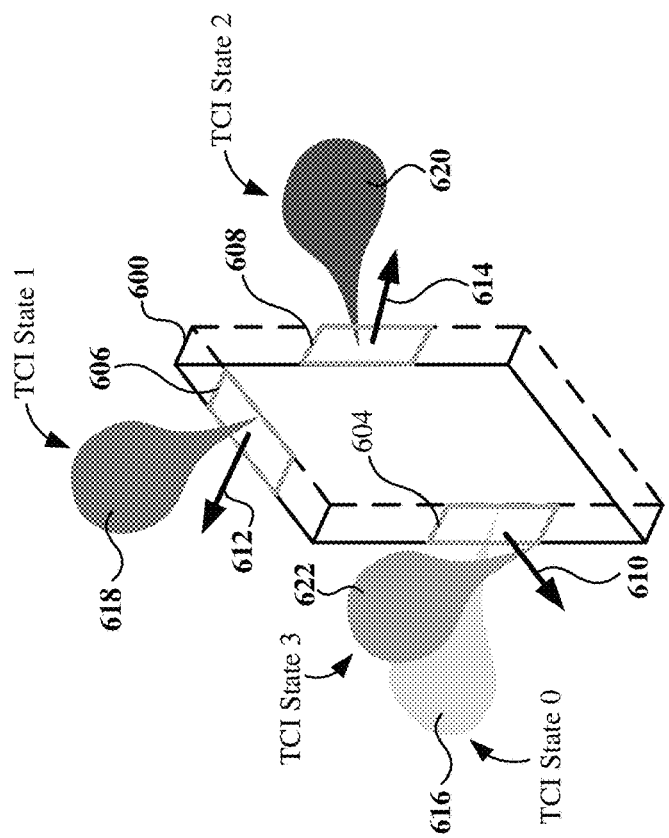

FIG. 6 (including FIGS. 6A and 6B) illustrates example beams formed at a UE 600 when communicating with different base stations in a 5G NR network. As shown in FIG. 6A, the UE 600 may include antenna modules 604, 606, 608. As further shown in FIG. 6A, the UE 600 may use the antenna module 604 to form beams 616, 622 in a first direction 610, the antenna module 606 to form beam 618 in a second direction 612, and the antenna module 608 to form beam 620 in a third direction 614. In the example scenario of FIG. 6A, the beams 616, 618, 620, and 622 may correspond to respective transmission configuration indication (TCI) states 0, 1, 2, and 3.

In FIG. 6A, the UE 600 may be operating in a full-duplex mode and, therefore, may simultaneously transmit uplink signals to a first base station in a 5G NR network using one or more transmit beams and may receive downlink signals from the first base station using one or more receive beams. For example, the UE 600 may form one or more transmit beams (e.g., beams 618, 620) in a first frequency band (e.g., 24.25 GHz to 52.6 GHz, which is also referred to as frequency range 2 (FR2)) and may form one or more receive beams (e.g., beams 616, 622) in a second frequency band (e.g., 52.6 GHz to 114.25 GHz, which is also referred to as frequency range 4 (FR4)). In one example implementation, the transmit beams in FIG. 6A may have a frequency of approximately 28 GHz and the receive beams in FIG. 6A may have a frequency of approximately 60 GHz.

In FIG. 6B, the UE 600 may continue to operate in the full-duplex mode and, therefore, may simultaneously transmit uplink signals to a second base station in a 5G NR network using one or more transmit beams and may receive downlink signals from the second base station using one or more receive beams. For example, the UE 600 may form one or more transmit beams (e.g., beams 654, 656) in a first frequency band (e.g., 24.25 GHz to 52.6 GHz, which is also referred to as frequency range 2 (FR2)) and may form one or more receive beams (e.g., beams 652, 658) in a second frequency band (e.g., 52.6 GHz to 114.25 GHz, which is also referred to as frequency range 4 (FR4)). In one example implementation, the transmit beams in FIG. 6B may have a frequency of approximately 28 GHz and the receive beams in FIG. 6B may have a frequency of approximately 60 GHz. In the example scenario of FIG. 6B, the beams 652, 654, 656, and 658 may correspond to respective TCI states A, B, C, and D.

In some examples, and as shown in FIGS. 6A and 6B, a beam formed in a particular direction may be associated with one TCI state with respect to one base station, and another beam formed in a same or similar direction may be associated with another TCI state with respect to another base station. For example, the beam 618 in FIG. 6A formed in direction 612 may be associated with TCI state 1, and the beam 654 in FIG. 6B formed in the same direction 612 may be associated with TCI state B.

Figure 7:
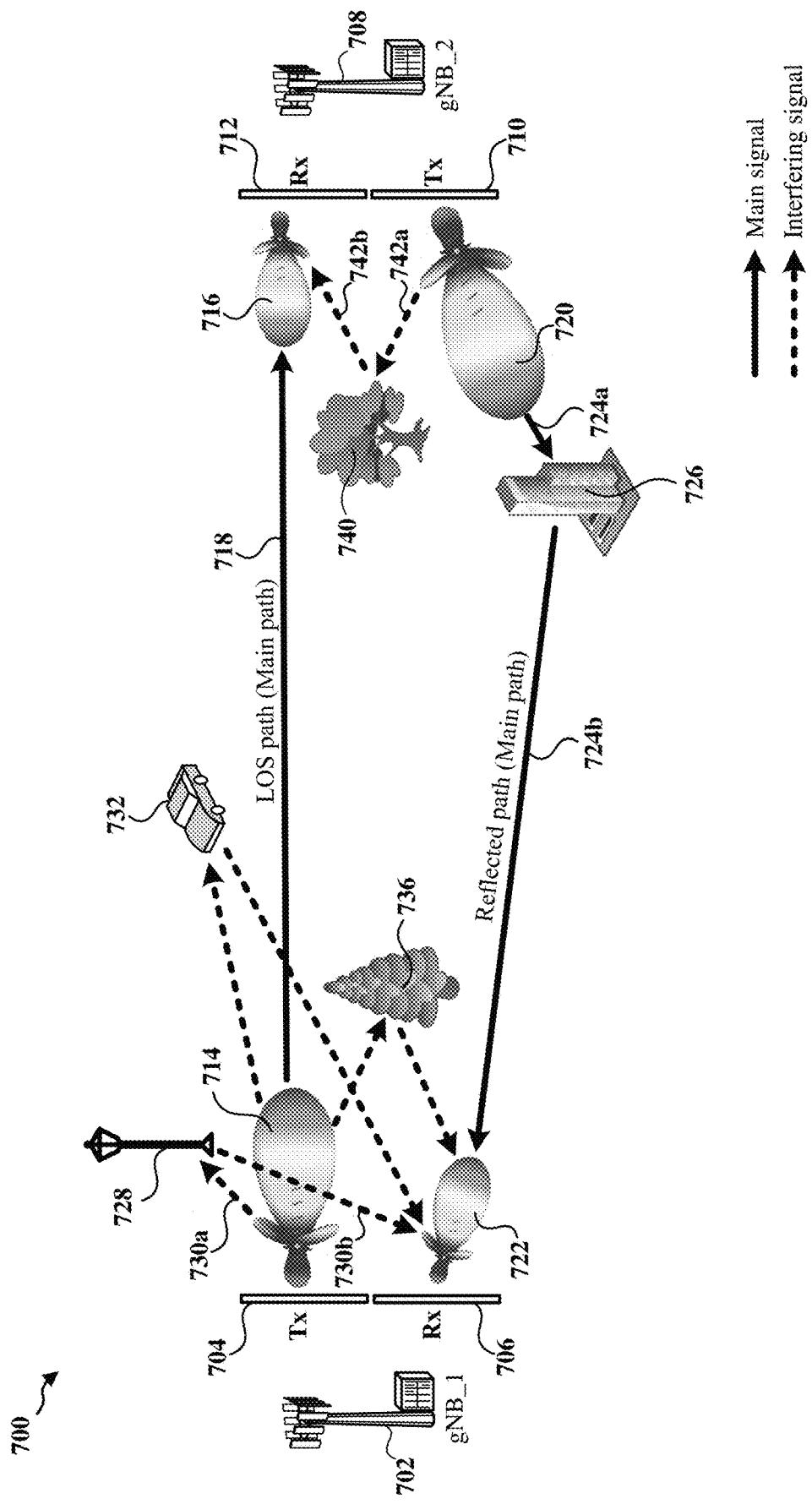
FIG. 7 shows an example of a full-duplex (FD) system.

FIG. 7 shows an example of a full-duplex (FD) system 700. The FD system 700 includes a first base station (gNB_1) 702 having a transmit node 704 and a receive node 706, and a second base station (gNB_2) 708 having a transmit node 710 and a receive node 712. In some implementations, the gNB_1 702 and gNB_2 708 may each be an integrated access and backhaul (IAB) node. In other implementations, the gNB_1 702 and gNB_2 708 may be replaced with UEs (e.g., communicating on a side link) or with customer premises equipments (CPEs).

As shown in FIG. 7, the transmit node 704 (also referred to as a transmitter element) of the gNB_1 702 may form a transmit beam 714, and the receive node 706 (also referred to as a receiver element) of the gNB_1 702 may form a receive beam 722. As further shown in FIG. 7, the transmit node 710 of the gNB_2 708 may form a transmit beam 720, and the receive node 712 (also referred to as a receiver element) of the gNB_2 708 may form a receive beam 716. The transmit beam 714 may be aligned with the receive beam 716, thereby enabling signal transmissions from the transmit node 704 to propagate to receive node 712 along the line of sight (LOS) path 718 (also referred to as a first main path). The transmit beam 720 is not aligned with the receive beam 722, however, signal transmissions from the transmit node 710 may propagate to receive node 706 along a direction 724a of the transmit beam 720 and a reflected path 724b (also referred to as a second main path) formed by a structure 726.

The FD system 700 may include clutter objects, such as the clutter objects 728, 732, 736, 740, that may reflect signal transmissions from a transmit node of a device (e.g., a base station or UE) toward a path of a receive node of the device creating unintended interference. Such signal interference may degrade intended signal transmissions resulting in a reduction of data transmission rates and other negative effects (e.g., increased block errors, path blockage, etc.). For example, a first interfering signal may propagate along the path 730a and may reflect off clutter object 728 (e.g., a street lamp). The reflected first interfering signal may then propagate along the path 730b toward the receive node 706, thereby interfering with incoming transmissions along the reflected path 724b. As another example, a second interfering signal may propagate along the path 742a and may reflect off clutter object 740 (e.g., a tree). The reflected second interfering signal may then propagate along the path 742b toward the receive node 712, thereby interfering with incoming transmissions along the LOS path 718.

Cross-link interference may be mitigated between two UEs using beam coordination and/or using slot format indication (SFI) coordination. Since the SFI may be a slot format index as previously described, SFI coordination may include slot format index coordination as described herein. For example, the SFI coordination between the two UEs may be configured by the network. Beam coordination or slot format indication (SFI) coordination between two UEs may be referred to as inter-UE coordination. In a full-duplex (FD) system, transmit (Tx) nodes and receive (Rx) nodes may be coordinated to mitigate CLI. However, base stations in a full-duplex (FD) system operating within two different bands may be uncoordinated.

The usage of intra-band CA or inter-band CA with a single transmission reception point (TRxP) or multiple coordinated TRxPs may significantly increase the performance of a UE. As described herein, coordination of multiple TRxPs operating in a dynamic TDD scheme may enable CLI mitigation.

Figure 8:
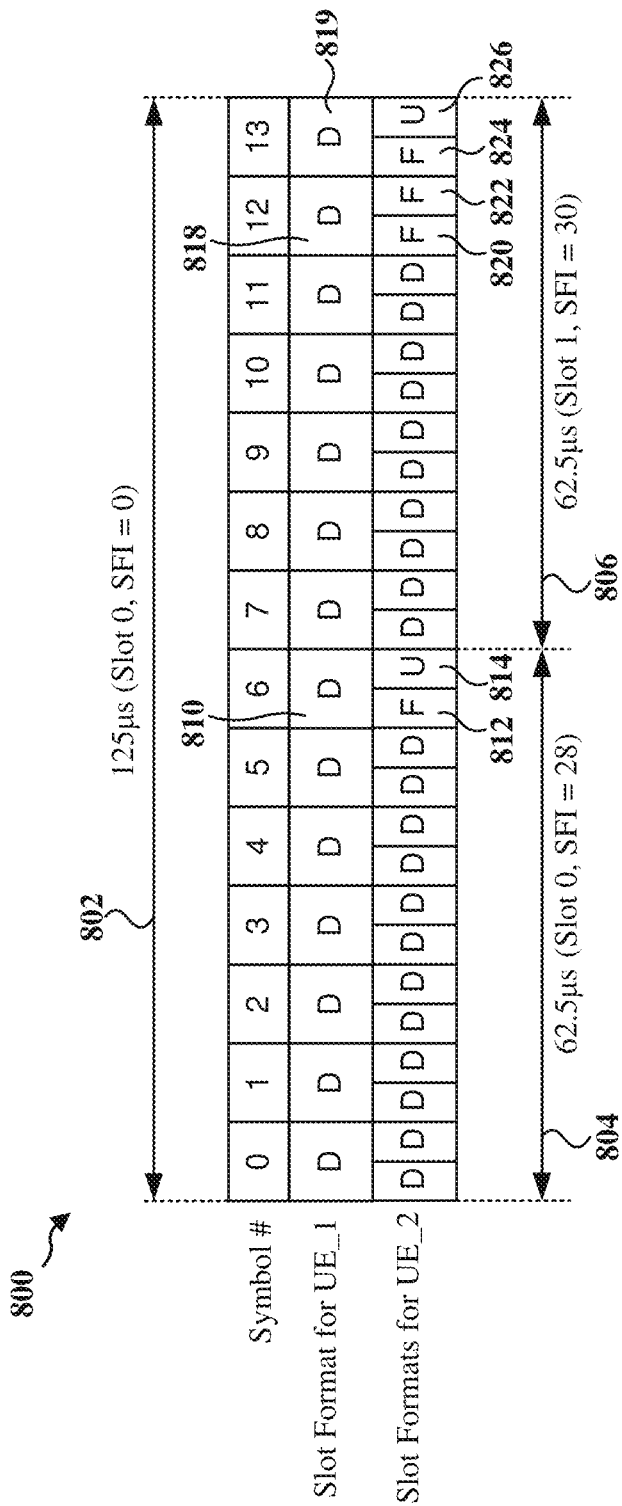
FIG. 8 includes an example time division duplex (TDD) configuration that may be applied at an example 5G NR network.

An example of CLI between two UEs operating within different frequency bands (e.g., FR2, FR4) is described with reference to FIG. 8. FIG. 8 includes an example TDD configuration 800 that may be applied in a network (e.g., 5G NR network 550). As shown in the example TDD configuration 800 of FIG. 8, a time slot (e.g., slot 0 802) of a subframe may include 14 symbols (e.g., symbol #0 to symbol #13). In the configuration of FIG. 8, for a first UE (referred to as UE_1 in FIG. 8) operating at approximately 28 GHz (e.g., within FR2), a subcarrier spacing (SCS) of 120 kHz may be used. Accordingly, the duration of slot 0 802 may be 125 microseconds (μs).

For a second UE (referred to as UE_2 in FIG. 8) operating at approximately 60 GHz (e.g., within FR4), an SCS of 240 kHz may be used. Accordingly, the duration of slot 0 804 and the duration of slot 1 806 may each be 62.5 μs. It should be understood that other SCS values may be used in other examples, such as an SCS of 480 kHz, 960 kHz, 1.92 MHz, etc. in future standard specifications for FR4. As shown in FIG. 8, the scaled numerology used for the 120 kHz and 240 kHz subcarrier spacing enables two 240 kHz slots (e.g., slots 804, 806) to be accommodated within a single 120 kHz slot (e.g., slot 802). Therefore, it should be noted that different slot period structures may be used for different UEs, which may lead to an increased set of opportunities in time for UL signals transmitted in UL symbols to interfere with DL signals received in DL symbols.

As shown in FIG. 8, the first UE (e.g., UE_1) may be assigned a first slot format (e.g., slot format index 0) that configures each symbol in the slot 0 802 as a DL symbol. As further shown in FIG. 8, the second UE (e.g., UE_2) may be assigned a second slot format (e.g., slot format index 28) for the slot 804 and a third slot format (e.g., slot format index 30) for the slot 806. The second slot format configures the first 12 symbols within the slot 804 as DL symbols, the thirteenth symbol (e.g., symbol 812) as a flexible (F) symbol, and the fourteenth symbol (e.g., symbol 814) as a UL symbol. The third slot format configures the first 10 symbols within the slot 806 as DL symbols, the eleventh, twelfth, and thirteenth symbols (e.g., symbols 820, 822, 824) as flexible (F) symbols, and the fourteenth symbol (e.g., symbol 826) as a UL symbol.

If the flexible symbol 812 in the slot 0 804 is used as a UL symbol, then the symbols 812 and 814 configured as UL symbols would conflict with the overlapping symbol #6 810 configured as a DL symbol. Therefore, the scenario in FIG. 8 may raise more opportunities for CLI between the first and second UEs. Furthermore, if the flexible symbols 820, 822, 824 in the slot 1 806 are used as UL symbols, then the symbols 820, 822, 824 configured as UL symbols would conflict with the overlapping symbol #12 818 and overlapping symbol #13 819 configured as DL symbols. Therefore, the scenario in FIG. 8 may raise even more opportunities for CLI between the first and second UEs.

In the scenarios described above with reference to FIG. 8, although the first and second UEs are operating within different frequency bands, higher harmonics of one signal may affect a different coexisting signal. For example, a second harmonic of the 28 GHz signal used by the first UE may interfere with the 60 GHz signal used by the second UE in the previously described opportunities (e.g., during the symbols 820, 822, 824, 826 configured as UL symbols) for CLI between the first and second UEs.

Figure 9:
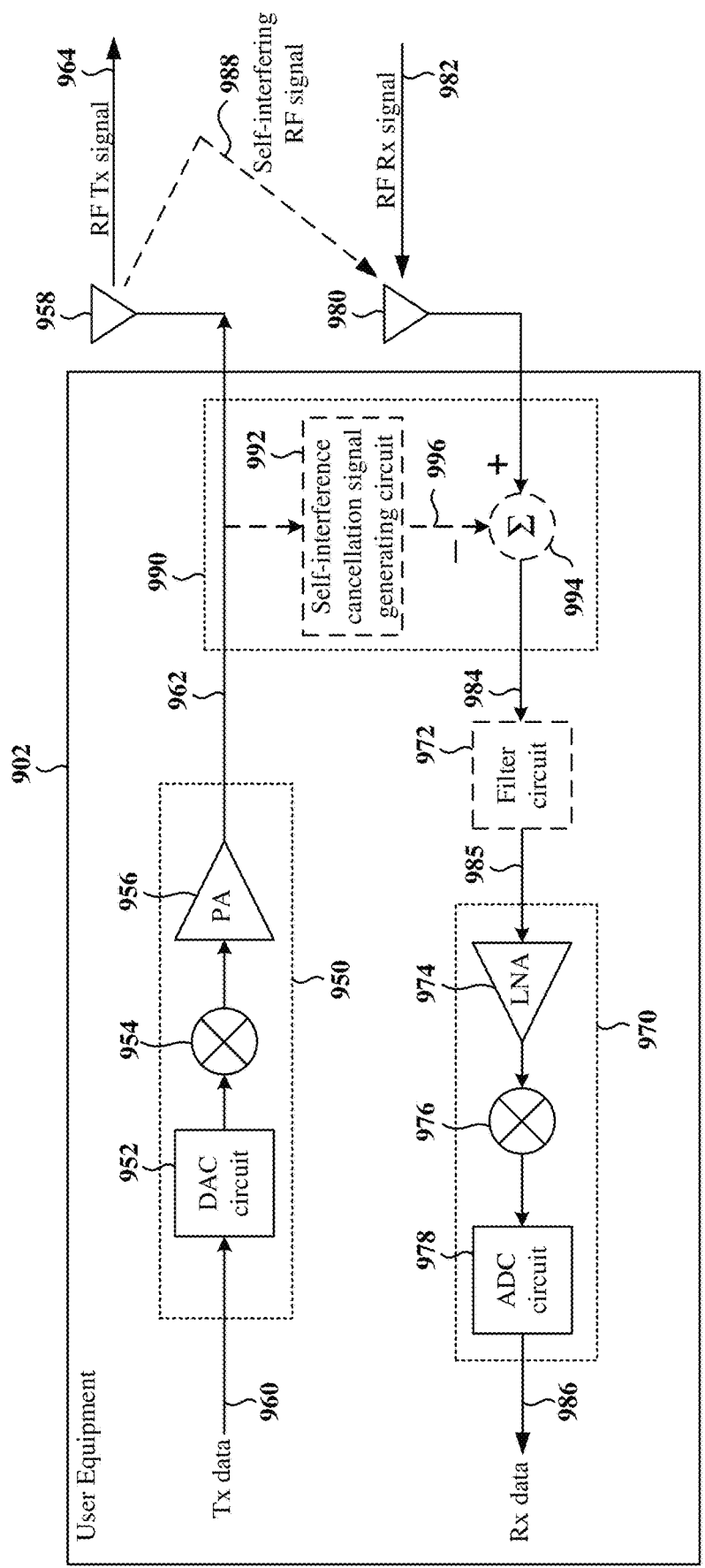
FIG. 9 is a diagram illustrating an example transmit chain and an example receive chain of a UE.

FIG. 9 illustrates a block diagram of a user equipment (UE) 902 including an RF transmit chain 950 (also referred to as a transmit chain or transmitter chain) and an RF receive chain 970 (also referred to as a receive chain or receiver chain). The RF transmit chain 950 may include a digital-to-analog converter (DAC) circuit 952, a mixer circuit 954, and a power amplifier (PA) circuit 956. The RF transmit chain 950 may receive transmit (Tx) data (e.g., digital data) at the input 960 and may provide a signal carrying the Tx data at an output 962. The signal at the output 962 may be provided to a transmit antenna 958 and may be transmitted as an RF transmit (Tx) signal 964.

The RF receive chain 970 may include a low noise amplifier (LNA) circuit 974, a mixer circuit 976, and an analog-to-digital converter (ADC) circuit 978. An input 984 of the RF receive chain 970 may be coupled to a receive antenna 980. The RF receive chain 970 may receive an RF receive (Rx) signal 982 carrying receive (Rx) data and may provide the Rx data (e.g., digital data) at the output 986 of the receive chain 970.

In some examples, the UE 902 may include one or more circuits for performing hardware-based self-interference mitigation. The term "hardware-based self-interference mitigation" may refer to the use of hardware (e.g., circuits, electronic devices, physical components, etc.) to cancel or suppress a self-interfering RF signal (e.g., an interfering signal originating from the UE 902 during full-duplex (FD) communication) received at a receive antenna of the UE 902. For example, the one or more circuits for hardware-based self-interference mitigation may include a filter circuit 972 and/or a self-interference cancellation circuit 990. The filter circuit 972 may include a bulk acoustic wave (BAW) filter device, a surface acoustic wave (SAW) filter device, and/or other suitable filter devices. In some examples, the filter circuit 972 may be implemented as a bandpass filter to allow a select range of frequencies to pass through to the LNA circuit 974. For example, the select range of frequencies may include frequencies within the frequency band of the receive chain to prevent interfering signals from entering the RF receive chain 970.

The self-interference cancellation circuit 990 may include a self-interference cancellation signal generating circuit 992 and a combiner circuit 994. The self-interference cancellation signal generating circuit 992 may receive the signal carrying the Tx data at the output 962 and may invert the phase of the signal carrying the Tx data to generate a cancellation signal 996. The cancellation signal 996 may include one or more harmonics of the signal carrying the Tx data at the output 962. The cancellation signal 996 may be provided to the combiner circuit 994.

When the UE 902 is communicating in full-duplex (FD) mode, RF transmissions from the transmit antenna 958 may reflect off of clutter objects and may return as an interfering signal 988 at the receive antenna 980. In some examples, if the UE 902 is equipped with the self-interference cancellation circuit 990, the cancellation signal 996 may cancel the interfering signal 988 at the combiner circuit 994. In other examples, if the UE 902 is equipped with the filter circuit 972, the filter circuit 972 may filter out the interfering signal 988 from the RF Rx signal 982.

Figure 10:
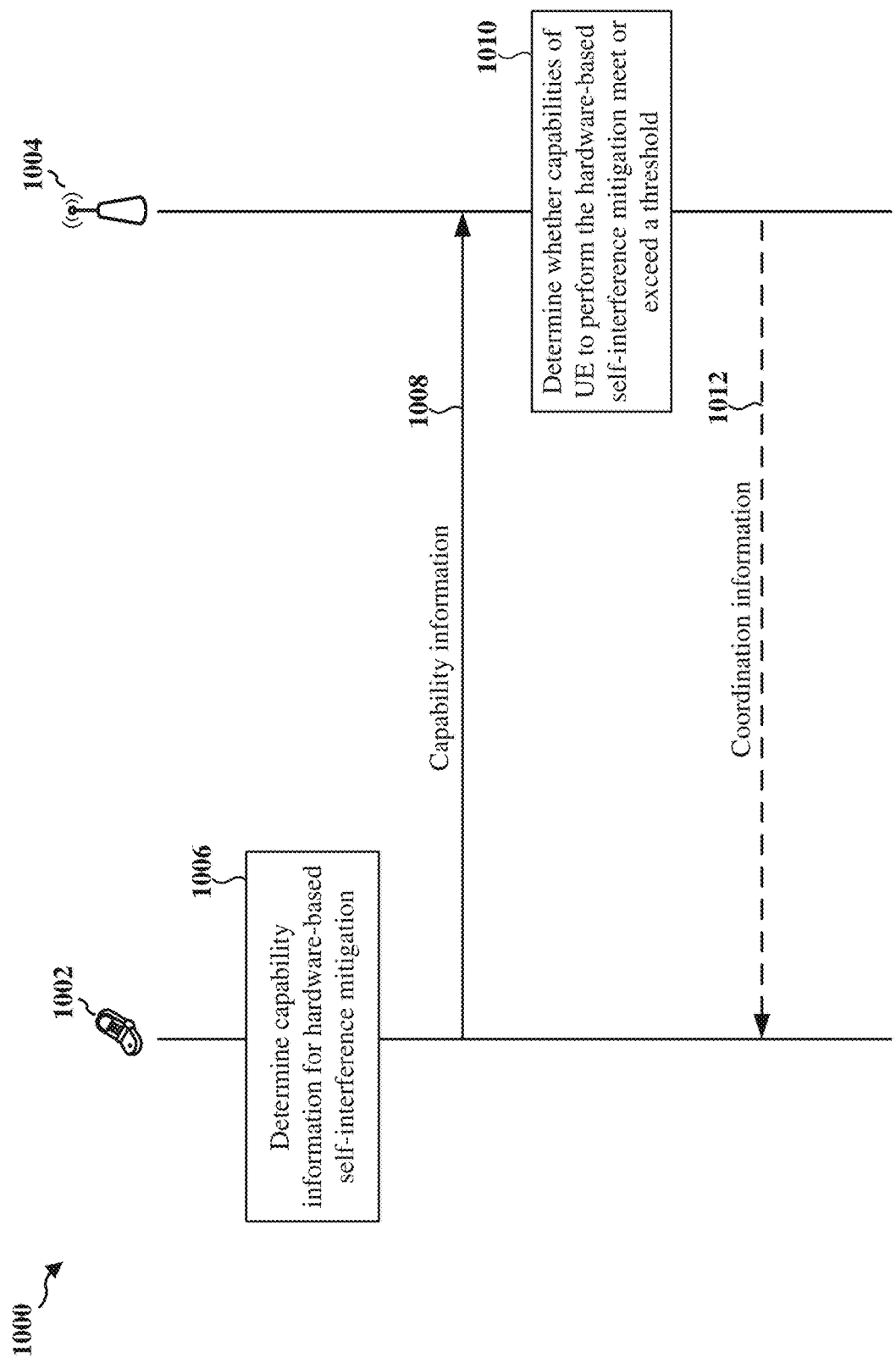
FIG. 10 illustrates a signal flow diagram of an approach for mitigating self-interference at a UE in a 5G NR network in accordance with various aspects of the disclosure.

FIG. 10 illustrates a signal flow diagram 1000 of an approach for mitigating self-interference at a UE in a network (e.g., a 5G NR network) in accordance with various aspects of the disclosure. In FIG. 10, the UE 1002 may be configured for full-duplex (FD) communication with the base station 1004. For example, the UE 1002 may simultaneously transmit uplink signals to the base station 1004 using one or more transmit beams and may receive downlink signals from the base station 1004 using one or more receive beams. In one example implementation, at least one transmitter node (e.g., a set of transmit antennas) and corresponding RF transmit chain (also referred to as a transmit chain) of the UE 1002 may be configured to operate within a first frequency band (e.g., within FR2) and at least one receiver node (e.g., a set of receive antennas) and corresponding RF receive chain (also referred to as a receive chain) of the UE 1002 may be configured to operate within a second frequency band (e.g., within FR4). For example, the UE 1002 may use full-duplex (FD) communication to transmit signals (e.g., UL signals) at a frequency of approximately 28 GHz and receive signals (e.g., DL signals) at a frequency of approximately 60 GHz.

In some aspects of the disclosure, the hardware design of the transmitter node and corresponding transmit chain of the UE 1002 may be configured to operate within the first frequency band (e.g., within FR2), and the hardware design of the receiver node and corresponding receive chain of the UE 1002 may be configured to operate within the second frequency band (e.g., within FR4). In other aspects of the disclosure, the UE 1002 may receive at least one command or setting from the base station 1004 which configures the transmitter node and corresponding transmit chain of the UE 1002 to operate within the first frequency band (e.g., within FR2) and/or configures the receiver node and corresponding receive chain of the UE 1002 to operate within the second frequency band (e.g., within FR4). In the aspects described herein, when the transmitter node and corresponding transmit chain of the UE 1002 is configured to operate within the first frequency band and the receiver node and corresponding receive chain of the UE 1002 is configured to operate within the second frequency band, the UE 1002 may be actively transmitting RF signals within the first frequency band and may be actively receiving RF signals within the second frequency band.

As shown in FIG. 10, the UE 1002 may determine capability information indicating any capabilities of the UE 1002 for hardware-based self-interference mitigation between at least one transmit chain of the UE 1002 and at least one receive chain of the UE 1002. In some examples, the self-interference (also referred to as CLI) may be caused by second harmonics of 28 GHz transmit signals from a transmit chain of the UE 1002, which may interfere with 60 GHz receive signals at a receive chain of the UE 1002. In some examples, the hardware-based self-interference mitigation may be achieved using one or more circuits (e.g., a filter circuit, a self-interference cancellation circuit), an antenna configured to perform the hardware-based self-interference mitigation, and/or a power supply decoupling network. Accordingly, in this example, the capability information may indicate whether the UE 1002 includes one or more circuits to perform the hardware-based self-interference mitigation, whether the UE 1002 includes an antenna array configured to perform the hardware-based self-interference mitigation, and/or whether the UE 1002 includes a robust power supply decoupling network. In some examples, a robust power supply decoupling network may include one or more decoupling components (e.g., capacitors, inductors) configured to filter out noise at the output of the power supply of the UE 1002 and prevent the noise from reaching RF sensitive devices in the UE 1002 (e.g., the power amplifier circuit 956, the low noise amplifier circuit 974, etc.).

As shown in FIG. 10, the UE 1002 may transmit a message 1008 that includes the capability information to the base station 1004. For example, the capability information may be indicated in the message 1008 using one or more bits in a hardware-based bit field as part of a capability exchange procedure with the base station 1004.

At 1010, the base station 1004 may determine whether the capability information indicates that the capabilities of the UE for hardware-based self-interference mitigation meet or exceed a threshold. In some examples, the base station 1004 may determine a capability score for a UE based on the capabilities for hardware-based self-interference mitigation indicated in the capability information, and may determine whether the capability score meets or exceeds the threshold. In these examples, higher scores may represent greater capability for hardware-based self-interference mitigation. For example, a UE including both a filter circuit and a self-interference cancellation circuit (e.g., the filter circuit 972 and the self-interference cancellation circuit 990 as shown in FIG. 9) may achieve a higher capability score than a UE that includes only the filter circuit or only the self-interference cancellation circuit.

If the base station 1004 determines 1010 that the capabilities of the UE 1002 for hardware-based self-interference mitigation are below the threshold (e.g., the capability score does not meet or exceed the threshold), the base station 1004 may transmit a message 1012 that includes coordination information configured to mitigate the self-interference between at least one transmit chain of the UE 1002 and at least one receive chain of the UE 1002. In some aspects, the coordination information may include subcarrier spacing (SCS) coordination information, beam coordination information, and/or the slot format index coordination information for the first and second frequency bands. The UE 1002 may receive and apply the coordination information to mitigate any self-interference between at least one transmit chain of the UE 1002 and at least one receive chain of the UE 1002.

Self-Interference Mitigation Using Subcarrier Spacing (SCS) Coordination

Figure 11:
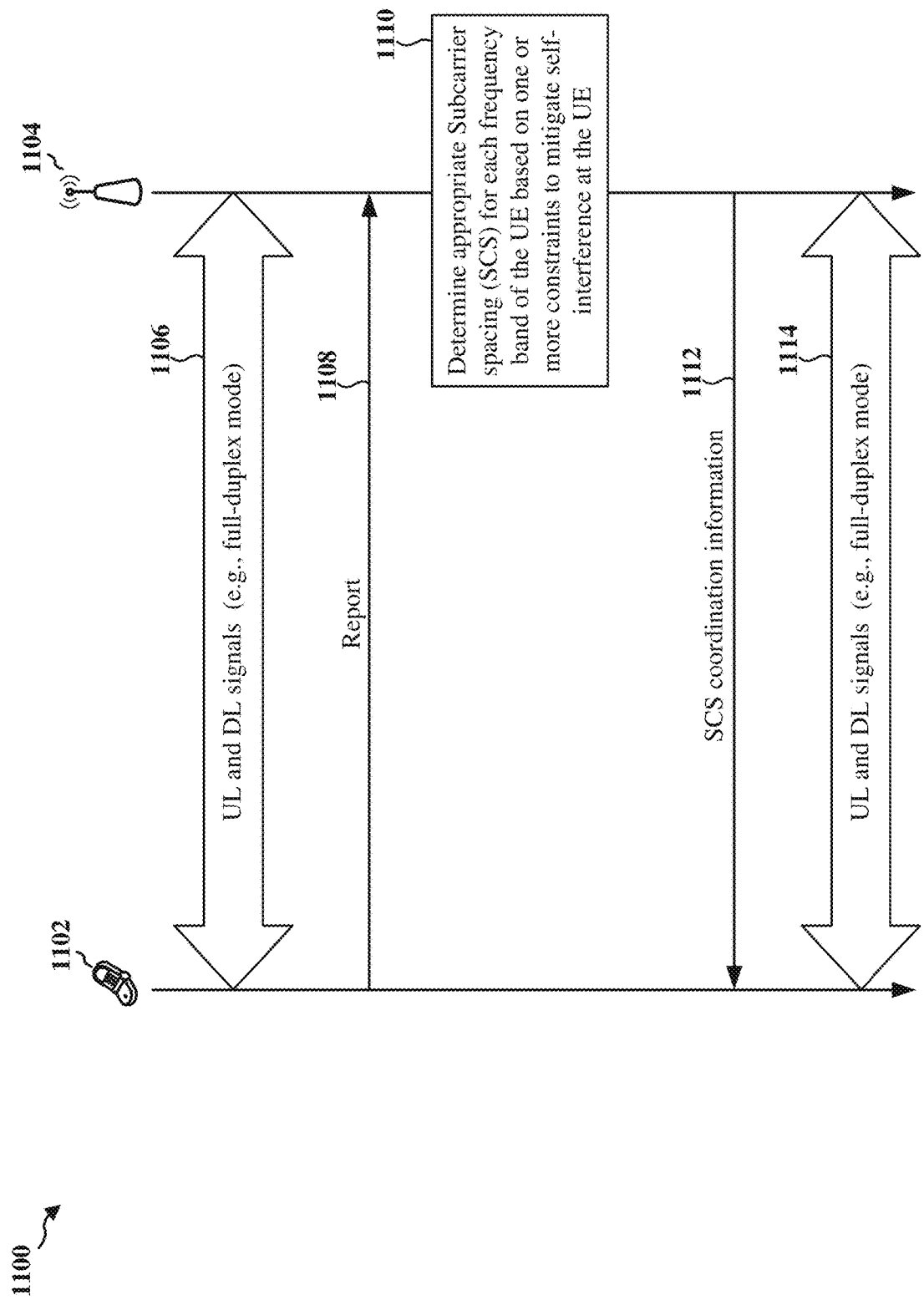
FIG. 11 illustrates a signal flow diagram for mitigating self-interference at a UE in a 5G NR network based on subcarrier spacing (SCS) coordination in accordance with various aspects of the disclosure.

FIG. 11 illustrates a signal flow diagram 1100 for mitigating self-interference at a UE in a network (e.g., a 5G NR network) based on subcarrier spacing (SCS) coordination in accordance with various aspects of the disclosure. SCS coordination may refer to the determination of SCS configurations for different bands and/or carriers of a UE communicating (e.g., transmitting and receiving) in full-duplex (FD) mode for purposes of mitigating self-interference at the UE. Therefore, SCS coordination information may indicate at least one SCS configuration, such as a first SCS configuration, for a first frequency band a UE may use for signal transmissions and at least one SCS configuration, such as a second SCS configuration, for a second frequency band the UE may use for signal receptions. For example, the first and second SCS configurations may mitigate self-interference at the UE when the UE is concurrently transmitting and receiving in full-duplex (FD) mode. For example, a UE may receive the SCS coordination information in an RRC message from the network (e.g., a base station), where the RRC message includes an information element (IE) indicating an SCS value associated with a frequency band. In some examples, an SCS configuration may include an SCS value of 15 kHz, 30 kHz, 60 kHz, 120 kHz, or 240 kHz.

In FIG. 11, the UE 1102 may be configured for full-duplex (FD) communication with the base station 1104. For example, the UE 1102 may simultaneously transmit uplink signals to the base station 1104 using one or more transmit beams and may receive downlink signals from the base station 1104 using one or more receive beams. In one example implementation, at least one transmitter node (e.g., a transmit antenna) and corresponding transmit chain of the UE 1102 may be configured to operate within a first frequency band (e.g., within FR2) and at least one receiver node (e.g., a receive antenna) and corresponding receive chain of the UE 1102 may be configured to operate within a second frequency band (e.g., within FR4). Therefore, in some examples, the first and second frequency bands are nonoverlapping. In some examples, the UE 1102 may transmit signals (e.g., UL signals) at a frequency of approximately 28 GHz and may receive signals (e.g., DL signals) at a frequency of approximately 60 GHz.

As shown in FIG. 11, the UE 1102 and the base station 1104 may concurrently exchange UL and DL signals 1106 in a full-duplex (FD) mode. As further shown in FIG. 10, the UE 1102 may transmit a message 1108 including a report to the base station 1104. In some aspects, the UE 1102 may determine a quality of one or more DL signals from the base station 1104. In these aspects, the report may indicate the quality of the one or more DL signals. In some examples, the UE 1102 may determine a quality of a DL signal by obtaining a measurement of the DL signal (e.g., a reference signal received power (RSRP) measurement).

At 1110, the base station 1104 may determine an appropriate SCS configuration for each frequency band of the UE 1102 based on interference statistics to mitigate self-interference at the UE 1102. For example, the base station 1104 may determine a first SCS configuration for a first frequency band and a second SCS configuration for a second frequency band. In some aspects, the base station 1104 may determine the first SCS configuration and/or the second SCS configuration based on the interference statistics. In some examples, the base station 1104 may use one or more reports (e.g., the report in the message 1108) from the UE 1102 to determine the interference statistics. In some aspects, the base station 1104 may determine the first SCS configuration and/or the second SCS configuration based on signal measurements performed at the base station 1104 and/or statistics of any UE self-interference (e.g., CLI) detected at the base station 1104. In these aspects, for example, the base station 104 may coordinate the SCS by selecting a combination of SCS configurations (e.g., for the first SCS configuration and the second SCS configuration) that is likely to improve self-interference mitigation at the UE 1102 considering the signal measurements performed at the base station 1104 and/or the statistics of any UE self-interference (e.g., CLI) detected at the base station 1104.

In some aspects of the disclosure, and as discussed with reference to FIG. 11, the base station 1104 may determine the first SCS configuration and/or the second SCS configuration further based on one or more constraints. The base station 1104 may transmit a message 1112 that includes SCS coordination information to the UE 1102. In one example, the SCS coordination information may include a first SCS configuration for a first frequency band allocated for signal transmissions (e.g., in the UL) from the UE 1002, and a second SCS configuration for a second frequency band allocated for signal receptions (e.g., in the DL) at the UE 1102. For example, one of the first and second SCS configurations may have a lower SCS (e.g., a SCS of 120 kHz) and the other of the first and second SCS configurations may have a higher SCS (e.g., a SCS of 240 kHz).

The UE 1102 may transmit a first signal based on the first SCS configuration while receiving a second signal based on the second SCS configuration, where the first and second SCS configurations mitigate interference between the first and second signals. For example, at 1114 in FIG. 11, the UE 1102 may transmit a UL signal using the first SCS configuration while receiving a DL signal using the second SCS configuration.

As previously discussed, the base station 1104 may determine the first SCS configuration and/or the second SCS configuration further based on one or more constraints. For example, one of the first and second SCS configurations may have a lower SCS (e.g., a SCS of 120 kHz) and the other of the first and second SCS configurations may have a higher SCS (e.g., a SCS of 240 kHz). In some aspects, a first set of symbols in the lower SCS may be overlapping in a time domain with a second set of symbols in the higher SCS. This is illustrated in the example TDD configuration 1200 in FIG. 12.

Figure 12:
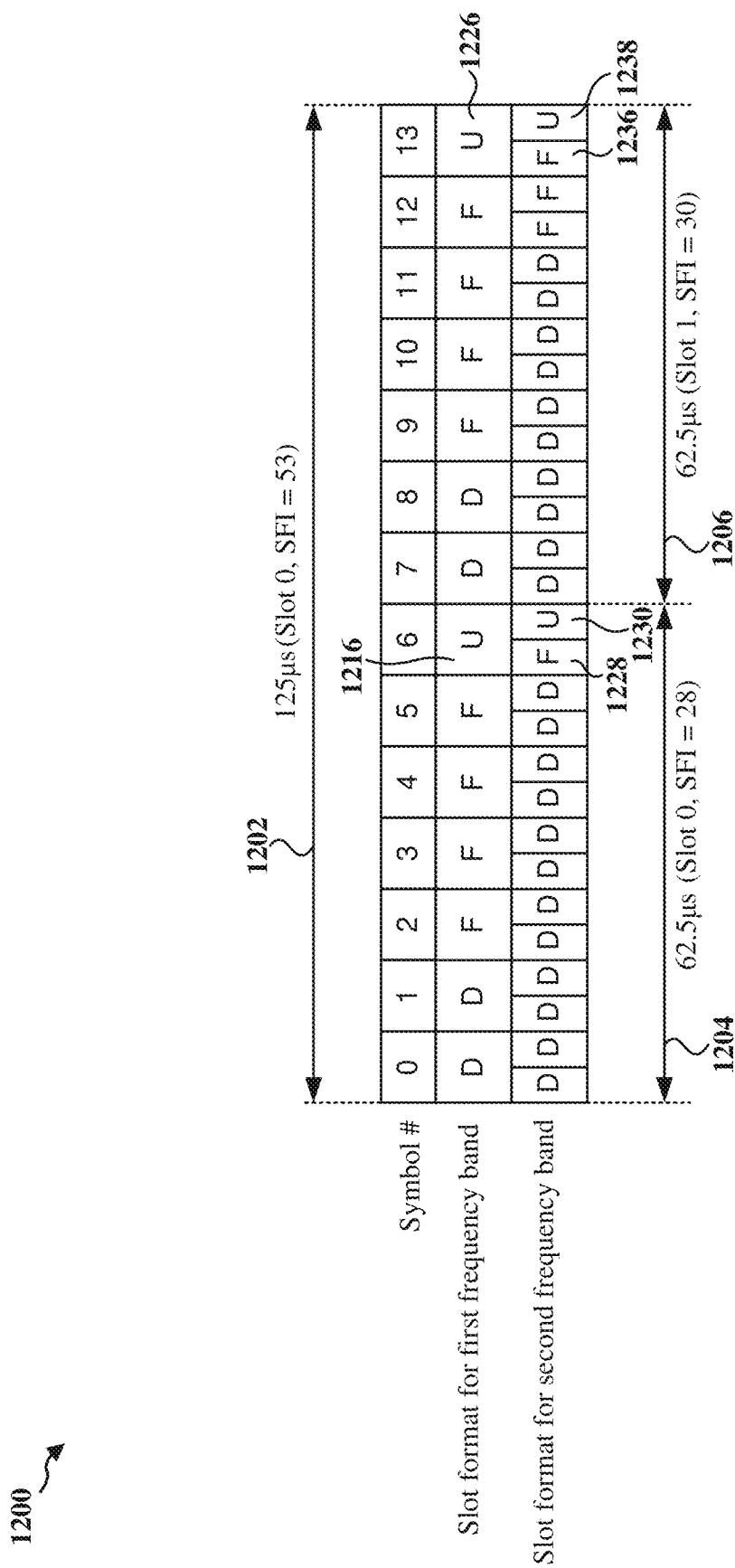
FIG. 12 is an example TDD configuration in accordance with various aspects of the disclosure.

As shown in the example TDD configuration 1200 of FIG. 12, a time slot (e.g., slot 0 1202) of a subframe may include 14 symbols (e.g., symbol #0 to symbol #13). In the configuration of FIG. 12, for the first frequency band (e.g., FR2) of the UE 1102, a subcarrier spacing (SCS) of 120 kHz may be used. Accordingly, the duration of slot 0 1202 may be 125 μs. For the second frequency band (e.g., FR4) of the UE 1102, a subcarrier spacing (SCS) of 240 kHz may be used. Accordingly, the duration of slot 0 1204 and the duration of slot 1 1206 may each be 62.5 μs. As shown in FIG. 12, due to the scaled numerology used for the 120 kHz and 240 kHz subcarrier spacing, two 240 kHz slots (e.g., slots 1204, 1206) may be accommodated within a single 120 kHz slot (e.g., slot 1202).

In some aspects of the disclosure, one or more of a first set of symbols in the lower SCS (e.g., symbols in the slot 0 1202) may be configured as one of a plurality of symbol types (e.g., an uplink (UL) symbol, a downlink (DL) symbol, and a flexible (F) symbol) based on one or more constraints. For example, a first constraint may ensure that one or more of the first set of symbols are configured to be the same symbol type as overlapping symbols in the second set of symbols in the higher SCS (e.g., symbols in the slot 0 1204). For example, if a slot format index 28 is applied to the symbols in slot 0 1204 and slot format index 30 is applied to the symbols in slot 1 1206 as shown in FIG. 12, the first constraint may ensure that the slot types of symbols in the slot 0 1202 are the same as overlapping symbols in slot 0 1204 and slot 1 1206. Accordingly, in FIG. 12, symbol 1216 is configured as a UL symbol to align with overlapping UL symbol 1230 and flexible symbol 1228 (e.g., where the flexible symbol 1228 is configured as a UL symbol), and symbol 1226 is configured as a UL symbol to align with overlapping UL symbol 1238 and flexible symbol 1236 (e.g., where the flexible symbol 1236 is configured as a UL symbol).

In some aspects of the disclosure, at least one constraint may enable one or more of the first set of symbols to be configured as a different symbol type as overlapping symbols in the second set of symbols when there is no interference between a beam in the first frequency band and a beam in the second frequency band.

Self-Interference Mitigation Using Beam Coordination and/or Slot Format Indication Coordination Beam coordination may refer to the use of a first beam formed at a first antenna of a UE in a first frequency band (e.g., a UL beam formed in FR2) as a coarse beam for a second beam formed at a second antenna of the UE in a second frequency band (e.g., a DL beam formed in FR4) when the UE is operating in full-duplex (FD) mode for purposes of mitigating self-interference at the UE. For example, when one or more beamforming parameters of a UL transmit beam formed at a first antenna of a UE operating in full-duplex (FD) mode are used as coarse beamforming parameters for a DL receive beam formed at a second antenna of the UE, potential interference from the UL transmit beam to the DL receive beam may be mitigated.

A UE may perform beam coordination using beam coordination information from the network (e.g., a base station). For example, beam coordination information may include at least a first beam indication for a first antenna and a first frequency band of the UE and at least a second beam indication for a second antenna and a second frequency band of the UE. An example of the first beam indication may be a first TCI state value, and an example of the second beam indication may include a second TCI state value. The beam coordination information (e.g., the first and second TCI state values) may be indicated to the UE via MAC signaling. In some examples, the first beam indication and the second beam indication may indicate the same beam or similar beams in terms of direction, power, and other appropriate beam characteristics.

Slot format indication (SFI) coordination may refer to the selection of slot formats for different bands and/or carriers of a UE communicating (e.g., transmitting and receiving) in full-duplex (FD) mode for purposes of mitigating self-interference at the UE. As previously described, SFI coordination may include slot format index coordination. In some examples, a base station may transmit slot format index coordination information to the UE, where the slot format index coordination information includes a first slot format index for a first frequency band a UE may use for signal transmissions and a second slot format index for a second frequency band the UE may use for signal receptions. For example, the first and second slot formats may avoid or prevent overlapping uplink symbols and downlink symbols to prevent self-interference at the UE. The UE may receive the slot format index coordination information (e.g., the first slot format index, the second slot format index) in a control message on a control channel (e.g., PDCCH) from the network. Each of the slot format indices in the slot format index coordination information may be mapped to a table of slot formats known to the UE. As described with reference to FIG. 12, an example of the first slot format index may include the slot format index 53, and examples of the second slot format index may include the slot format index 28 or 30.

In some aspects of the disclosure, a transmit/receive node in a full-duplex (FD) system, or a single transmission reception point (TRxP) or multiple coordinated TRxPs in a carrier aggregation system, may coordinate slot format indices (e.g., SFIs) and beam configuration information for full-duplex capable UEs and/or other full-duplex capable devices. In some examples, a base station may transmit beam coordination information and/or slot format indication coordination information to a UE configured for full-duplex communication. The beam coordination information and/or slot format indication coordination information may be configured to mitigate self-interference at the UE. In some examples, the slot format indication coordination information may include slot format index coordination information. The UE may then transmit with a first beam while receiving with a second beam based on at least the beam coordination information or the slot format indication coordination information.

For example, the base station may provide the UE beam coordination information which may configure a first beam formed at the UE in a first frequency band and a second beam formed at the UE in a second frequency band. In some examples, the beam coordination information may configure the first beam formed at the UE by configuring at least a direction of the first beam. In some examples, the first frequency band may include a lower frequency range (e.g., FR2) than the second frequency band (e.g., FR4). The first and second frequency bands may be nonoverlapping.

In some examples, the beam coordination information indicates that the second beam is to be formed based on a configuration of the first beam to mitigate interference between the first and second beams at the UE. The first beam may be a UL beam or a DL beam in FR2. In one example, the beam coordination information may indicate that the first beam in FR2 is to serve as a coarse beam for the second beam in FR4 and that the second beam is to be configured as a UL beam. In another example, the beam coordination information may indicate that that the first beam in FR2 is to serve as a coarse beam for the second beam configured in FR4 and that the second beam is to be configured as a DL beam.

In some aspects, the base station may determine whether to configure the second beam formed at the UE as a UL beam or DL beam based on one or more signal measurements. For example, the signal measurements may include a reference signal received power (RSRP), an angle of departure (AoD), an angle of arrival (AoA), a delay spread, and/or a signal quality report from the UE.

In some aspects, the base station may determine whether to configure the second beam formed at the UE as a UL beam or DL beam based on a channel structure, a data rate, a channel diversity, a power consideration, and/or a thermal consideration. The channel structure may be defined by a number of clusters in a network, one or more directions of the clusters in the network, and/or an angular spread value.

For example, the base station may provide the UE with slot format indication coordination information for the first and second frequency bands of the UE. For example, the slot format indication coordination information may include slot format index coordination information and may indicate a first slot format index for the first frequency band and a second slot format index for the second frequency band. The first and second slot format indices may be configured to mitigate self-interference between the first and second beams at the UE. In one example, with reference to FIG. 12, the base station may provide the UE with slot format indication coordination information including the slot format index 53 for a first frequency band and the slot format indices 28 and 30 for a second frequency band. In this example, the slot format index 53 for the first frequency band and the slot format indices 28 and 30 for the second frequency bands may be configured such that overlapping symbols are of the same symbol type (e.g., UL, DL, or F) to avoid or reduce self-interference at the UE during full-duplex (FD) communication.

In some aspects of the disclosure, the base station selects the first slot format index and the second slot format index to either provide more transmission opportunities (e.g., more DL symbols) than reception opportunities, or to provide more reception opportunities (e.g., more UL symbols) than transmission opportunities.

In some aspects of the disclosure, the base station selects the first slot format index and the second slot format index based on a preferred list of slot format indices for the UE, a complementary non-preferred list of slot format indices for the UE, or a prioritized list of slot format indices for the UE.

In some aspects of the disclosure, the base station selects the first slot format index and the second slot format index based on one or more channel types to be transmitted in overlapping symbols of the first and second slot format indices. The channel types may include a control channel, a data channel, or other type of channel. For example, the base station may select the first slot format index and the second slot format index such that overlapping symbols that are expected to include control information may be of different symbol types (e.g., a UL or DL symbol types), while overlapping symbols that are expected to include data may be of the same symbol type.

Therefore, the aspects described herein may enable an apparatus (e.g., a UE) operating in full-duplex (FD) mode to mitigate self-interference between at least one transmit chain of the apparatus and at least one receive chain of the apparatus using at least one of subcarrier spacing coordination information, beam coordination information, or slot format index coordination information. Accordingly, the aspects described herein may enable an apparatus having insufficient capabilities for hardware-based self-interference mitigation to effectively avoid or reduce self-interference when operating in full-duplex (FD) mode.

Figure 13:
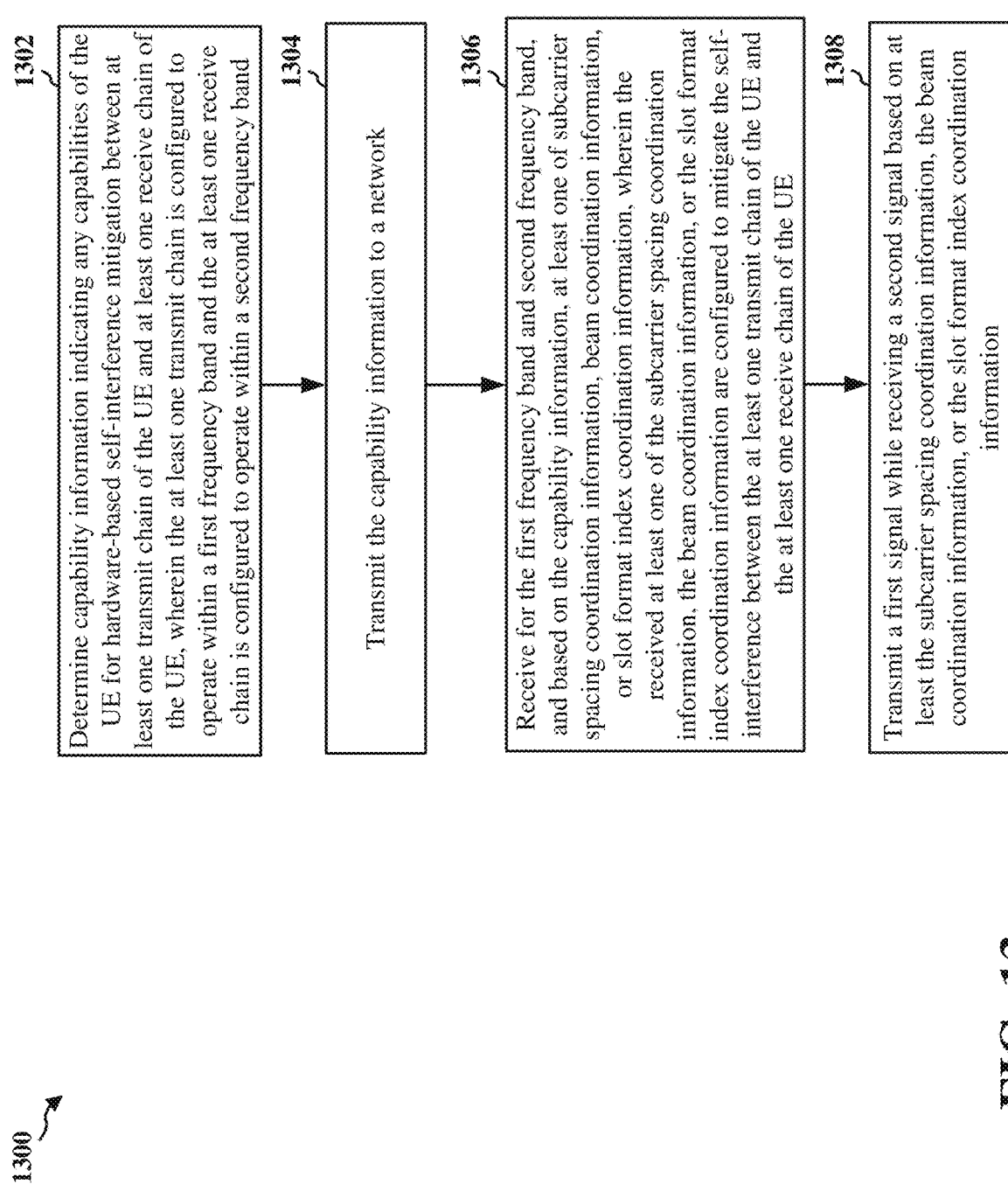
FIG. 13 is a flowchart of a method of wireless communication in accordance with various aspects of the disclosure.

FIG. 13 is a flowchart 1300 of a method of wireless communication. The method may be performed by a UE configured for full-duplex communication (e.g., the UE 104; the UE 1002; the apparatus 1702/1702'; the processing system 1814, which may include the memory 360 and which may be the entire UE 104 or a component of the UE 104, such as the TX processor 368, the RX processor 356, and/or the controller/processor 359).

At 1302, the UE determines capability information indicating any capabilities of the UE for hardware-based self-interference mitigation between at least one transmit chain of the UE and at least one receive chain of the UE. The at least one transmit chain is configured to operate within a first frequency band and the at least one receive chain is configured to operate within a second frequency band. For example, as previously described with reference to FIG. 10, the UE 1002 may determine capability information for hardware-based self-interference mitigation. In some aspects, the capability information indicates at least whether the UE includes one or more circuits to perform the hardware-based self-interference mitigation, whether the UE includes an antenna configured to perform the hardware-based self-interference mitigation, or whether the UE includes a robust power supply decoupling network. In some aspects, the first and second frequency bands are nonoverlapping, and the first frequency band includes a lower range of frequencies than the second frequency band.

At 1304, the UE transmits the capability information to a network. For example, with reference to FIG. 10, the UE 1002 may transmit a message 1008 that includes the capability information to the base station 1004.

At 1306, the UE receives for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information is configured to mitigate the self-interference between the at least one transmit chain of the UE and the at least one receive chain of the UE. For example, with reference to FIG. 10, the UE 1002 may receive a message 1012 that includes coordination information configured to mitigate the self-interference between at least one transmit chain of the UE 1002 and at least one receive chain of the UE 1002.

In some aspects, at least the subcarrier spacing coordination information, the beam coordination information, or the slot format index coordination information is received when the capability information indicates that the capabilities of the UE for hardware-based self-interference mitigation are below a threshold.

Finally, at 1308, the UE transmits a first signal while receiving a second signal based on at least the subcarrier spacing coordination information, the beam coordination information, or the slot format index coordination information.

Figure 14:
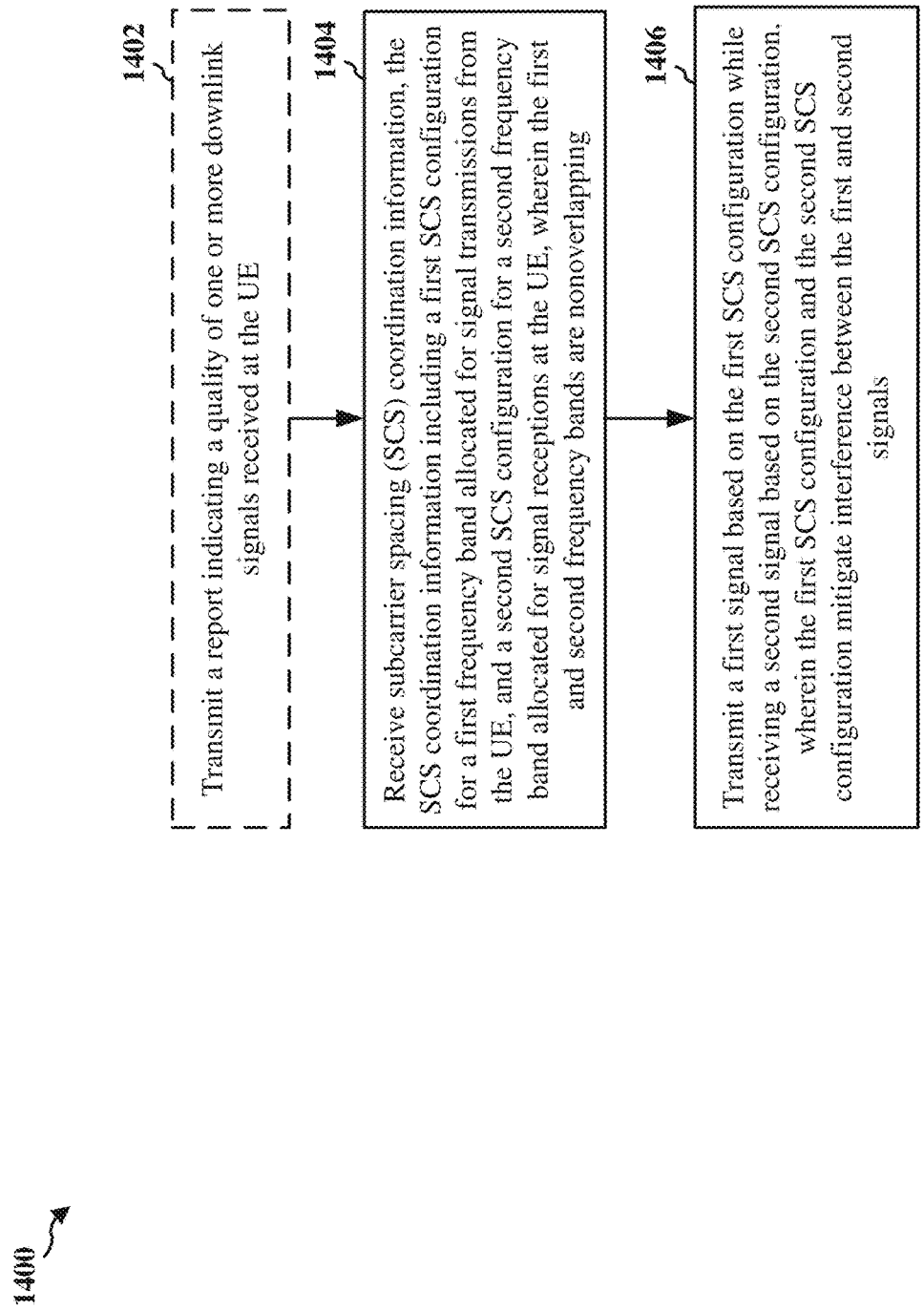
FIG. 14 is a flowchart of a method of wireless communication in accordance with various aspects of the disclosure.

FIG. 14 is a flowchart 1400 of a method of wireless communication. The method may be performed by a UE configured for full-duplex communication (e.g., the UE 104; the UE 1002; the UE 1102; the apparatus 1702/1702'; the processing system 1814, which may include the memory 360 and which may be the entire UE 104 or a component of the UE 104, such as the TX processor 368, the RX processor 356, and/or the controller/processor 359).

At 1402, the UE optionally transmits a report indicating a quality of one or more downlink signals received at the UE. For example, with reference to FIG. 11, the UE 1102 may determine a quality of one or more DL signals from the base station 1104 and may transmit a message 1108 including a report to the base station 1104. In this example, the report in the message 1108 may indicate the quality of the one or more DL signals. In some examples, the UE 1102 may determine a quality of a DL signal by obtaining a measurement of the DL signal (e.g., a reference signal received power (RSRP) measurement).

At 1404, the UE receives subcarrier spacing (SCS) coordination information, the SCS coordination information including a first SCS configuration for a first frequency band allocated for signal transmissions from the UE, and a second SCS configuration for a second frequency band allocated for signal receptions at the UE. The first and second frequency bands are nonoverlapping. For example, with reference to FIG. 11, the UE 1102 may receive a message 1112 that includes SCS coordination information from the base station 1104. In one example, the SCS coordination information may include a first SCS configuration for a first frequency band allocated for signal transmissions (e.g., in the UL) from the UE 1102, and a second SCS configuration for a second frequency band allocated for signal receptions (e.g., in the DL) at the UE 1102. For example, one of the first and second SCS configurations may have a lower SCS (e.g., a SCS of 120 kHz) and the other of the first and second SCS configurations may have a higher SCS (e.g., a SCS of 240 kHz).

In some aspects, the first SCS configuration or the second SCS configuration is based on interference statistics. For example, the interference statistics may be based on the report from the UE. In some aspects, one or more of a first set of symbols in the lower SCS are configured as one of a plurality of symbol types (e.g., a UL symbol, a DL symbol, a flexible (F) symbol) based on one or more constraints, and the first set of symbols are overlapping in a time domain with a second set of symbols in the higher SCS.

In some aspects, at least one constraint of the one or more constraints ensures that the one or more of the first set of symbols are configured to be a same symbol type as overlapping symbols in the second set of symbols, or that the overlapping set of symbols in the second set of symbols are configured to be the same symbol type as the one or more of the first set of symbols. In an aspect, at least one constraint of the one or more constraints enables one or more of the first set of symbols to be configured as a different symbol type as overlapping symbols in the second set of symbols when there is no interference between a beam in the first frequency band and a beam in the second frequency band.

Finally, at 1406, the UE transmits a first signal based on the first SCS configuration while receiving a second signal based on the second SCS configuration. The first SCS configuration and the second SCS configuration mitigate interference between the first and second signals. For example, at 1114 in FIG. 11, the UE 1102 may transmit a UL signal using the first SCS configuration while receiving a DL signal using the second SCS configuration.

Figure 15:
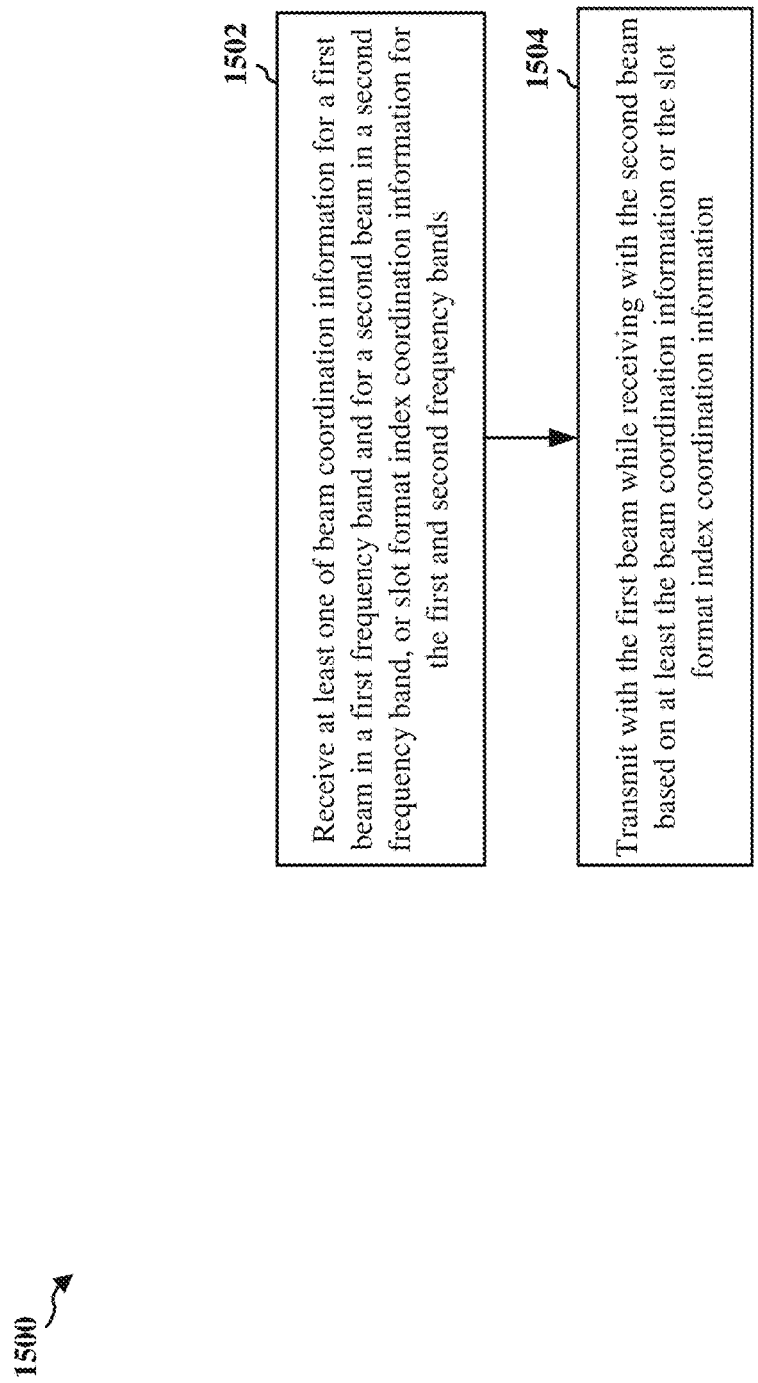
FIG. 15 is a flowchart of a method of wireless communication in accordance with various aspects of the disclosure.

FIG. 15 is a flowchart 1500 of a method of wireless communication. The method may be performed by a UE configured for full-duplex communication (e.g., the UE 104; the UE 1002; the apparatus 1702/1702'; the processing system 1814, which may include the memory 360 and which may be the entire UE 104 or a component of the UE 104, such as the TX processor 368, the RX processor 356, and/or the controller/processor 359).

At 1502, the UE receives at least one of beam coordination information for a first beam in a first frequency band and for a second beam in a second frequency band, and slot format index coordination information for the first and second frequency bands. The beam coordination information indicates that the second beam is to be formed based on a configuration of the first beam to mitigate interference between the first and second beams. The slot format index coordination information indicates a first slot format index for the first frequency band and a second slot format index for the second frequency band, where the first and second slot format indices are configured to mitigate the interference between the first and second beams.

In some aspects, the beam coordination information further indicates whether the second beam is to be configured as an uplink (UL) beam or a downlink (DL) beam. In some aspects, the beam coordination information indicating whether the second beam is to be configured as an uplink (UL) beam or a downlink (DL) beam is based on one or more signal measurements. For example, the one or more signal measurements may include at least a reference signal received power (RSRP), an angle of departure (AoD), an angle of arrival (AoA), a delay spread, or a signal quality report from the UE.

In some aspects, the beam coordination information indicating whether the second beam is to be configured as an uplink (UL) beam or a downlink (DL) beam is based on at least a channel structure, a data rate, a channel diversity, a power consideration, or a thermal consideration. In some aspects, the channel structure is defined by at least a number of clusters in a network, one or more directions of the clusters in the network, or an angular spread value. In some aspects, the configuration of the first beam includes at least a direction of the first beam.

In some aspects, the first frequency band includes a lower frequency range than the second frequency band. In some aspects, the first slot format index and the second slot format index are selected to provide more transmission opportunities than reception opportunities, or to provide more of the reception opportunities than the transmission opportunities.

In some aspects, the first slot format index and the second slot format index are selected based on a preferred list of slot format indices for the UE, a complementary non-preferred list of slot format indices for the UE, or a prioritized list of slot format indices for the UE. In some aspects, the first slot format and the second slot format are selected based on one or more channel types to be transmitted in overlapping symbols of the first and second slot format indices, wherein the one or more channel types includes at least a control channel or a data channel.

Finally, at 1504, the UE transmits with the first beam while receiving with the second beam based on at least the beam coordination information or the slot format index coordination information.

Figure 16:
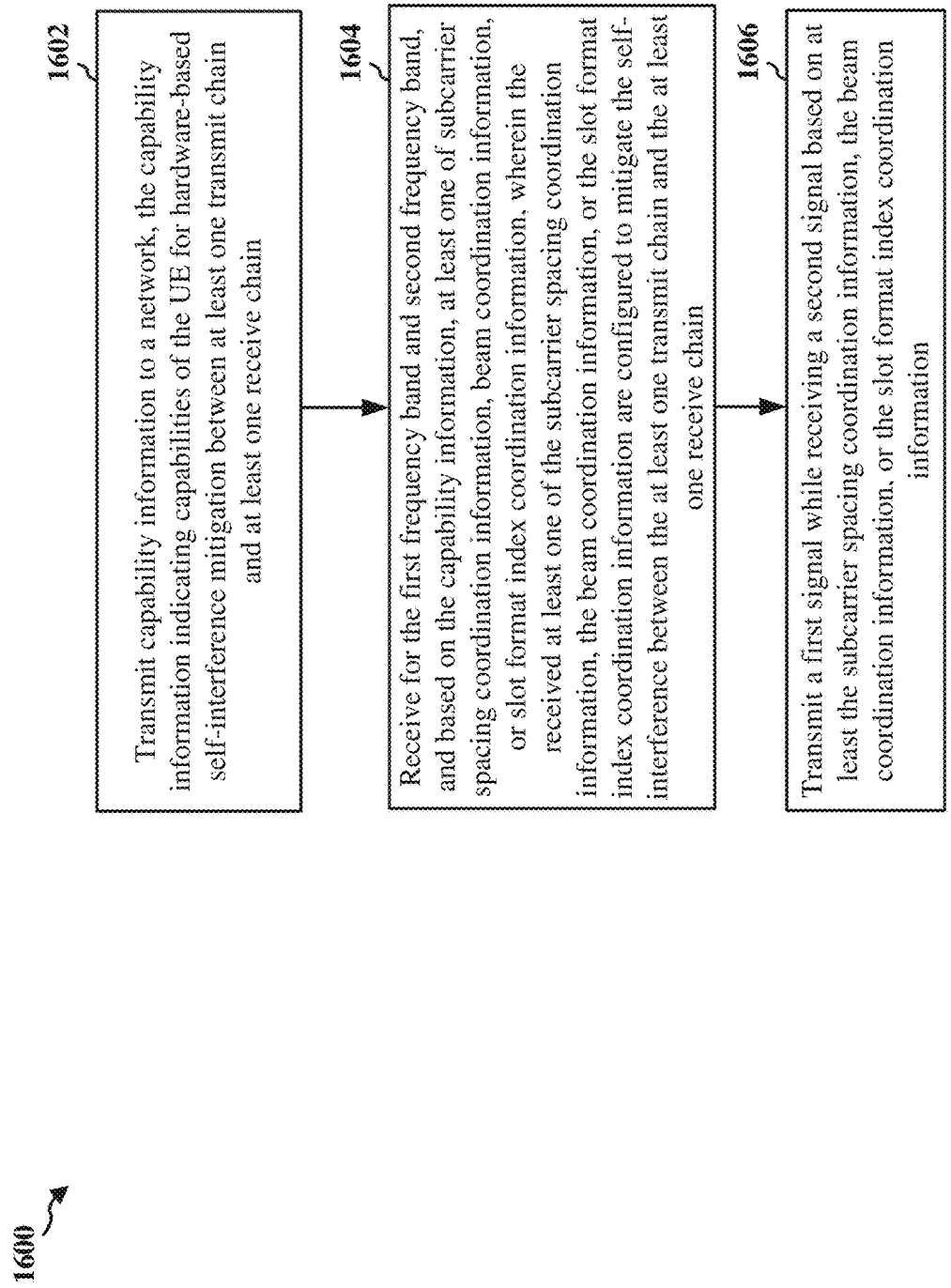
FIG. 16 is a flowchart of a method of wireless communication in accordance with various aspects of the disclosure.

FIG. 16 is a flowchart 1600 of a method of wireless communication. The method may be performed by a UE configured for full-duplex communication (e.g., the UE 104; the UE 902; the UE 1002; the apparatus 1702/1702'; the processing system 1814, which may include the memory 360 and which may be the entire UE 104 or a component of the UE 104, such as the TX processor 368, the RX processor 356, and/or the controller/processor 359).

At 1602, the UE transmits capability information to a network. The capability information indicates capabilities of the UE for hardware based self-interference mitigation between at least one transmit chain and at least one receive chain. For example, with reference to FIG. 10, the UE 1002 may transmit a message 1008 that includes the capability information to the base station 1004. Examples of the at least one transmit chain of the UE and the at least one receive chain of the UE are described in FIG. 9. For example, the UE 1002 may include the RF transmit chain 950 and the RF receive chain 970.

In some examples, the at least one transmit chain of the UE may be configured to operate within a first frequency band and the at least one receive chain of the UE may be configured to operate within a second frequency band. In some aspects, the capability information indicates at least whether the UE includes one or more circuits (e.g., filter circuit 972, self-interference cancellation circuit 990) to perform the hardware-based self-interference mitigation, whether the UE includes an antenna configured to perform the hardware-based self-interference mitigation, or whether the UE includes a robust power supply decoupling network. In some aspects, the first and second frequency bands are nonoverlapping, and the first frequency band includes a lower range of frequencies than the second frequency band.

At 1604, the UE receives for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information is configured to mitigate the self-interference between the at least one transmit chain and the at least one receive chain. For example, with reference to FIG. 10, the UE 1002 may receive a message 1012 that includes coordination information configured to mitigate the self-interference between at least one transmit chain of the UE 1002 and at least one receive chain of the UE 1002.

In some aspects, at least the subcarrier spacing coordination information, the beam coordination information, or the slot format index coordination information is received when the capability information indicates that the capabilities of the UE for hardware-based self-interference mitigation are below a threshold.

Finally, at 1606, the UE transmits a first signal while receiving a second signal based on at least the subcarrier spacing coordination information, the beam coordination information, or the slot format index coordination information.

Figure 17:
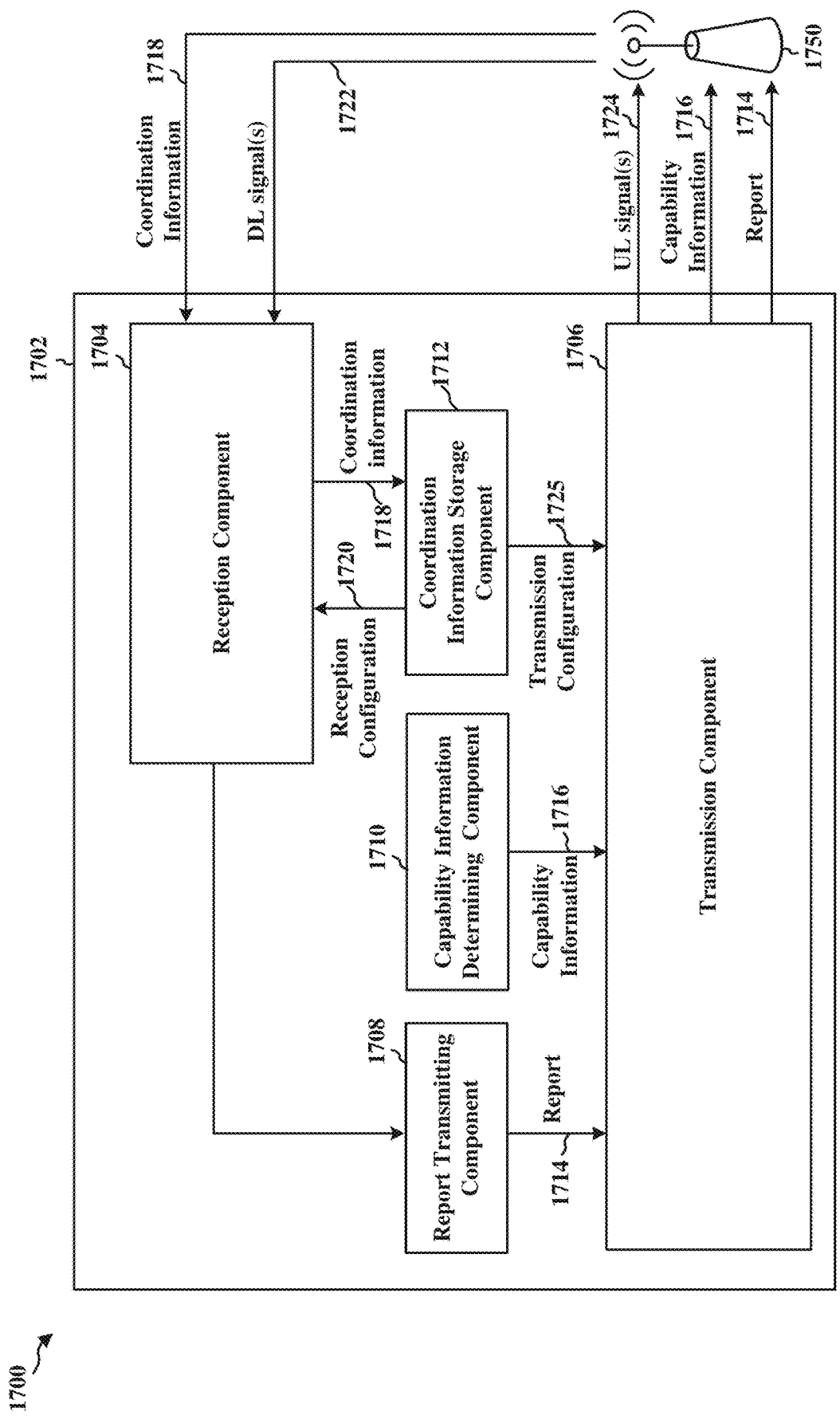
FIG. 17 is a conceptual data flow diagram illustrating the data flow between different means/components in an example apparatus in accordance with various aspects of the disclosure.

FIG. 17 is a conceptual data flow diagram 1700 illustrating the data flow between different means/components in an example apparatus 1702. The apparatus may be a UE (e.g., the UE 1002, 1102) configured for full-duplex communication. The apparatus includes a reception component 1704 that receives coordination information 1718 (e.g., via a DL signal) and DL signal(s) 1722 from the base station 1750. In some examples, the reception component 1704 may include a receive chain (e.g., the RF receive chain 970). The coordination information may include subcarrier spacing (SCS) coordination information, beam coordination information, and/or slot format index coordination information for the first and second frequency bands based on the capability information. In some examples, the SCS coordination information may include a first SCS configuration for a first frequency band (e.g., FR2) allocated for signal transmissions from the UE (e.g., the UL signal(s) 1724), and a second SCS configuration for a second frequency (e.g., FR4) band allocated for signal receptions at the UE (e.g., the DL signal(s) 1722), wherein the first and second frequency bands are nonoverlapping.

The apparatus further includes a transmission component 1706 that transmits capability information 1716 to a network (e.g., the base station 1750). In some examples, the transmission component 1706 may include a transmit chain (e.g., the RF transmit chain 950). The transmission component 1706 further transmits a first signal (e.g., UL signal 1724) based on the first SCS configuration (e.g., the transmission configuration 1725) while receiving a second signal (e.g., DL signal 1722) based on the second SCS configuration (e.g., the reception configuration 1720), wherein the first SCS configuration and the second SCS configuration mitigate interference between the first and second signals. The transmission component 1706 further transmits a first signal while receiving a second signal at the reception component 1704 based on at least the subcarrier spacing coordination information, the beam coordination information, or the slot format index coordination information. Each of the subcarrier spacing coordination information, the beam coordination information, or the slot format index coordination information may be implemented at the reception component 1704 with the reception configuration 1720 and at the transmission component 1706 with the transmission configuration 1725.

The apparatus further includes a report transmission component 1708 that transmits a report 1714 indicating a quality of one or more downlink signals received at the UE (e.g., DL signal(s) 1722), wherein the interference statistics are based on the report 1714.

The apparatus further includes capability information determining component 1710 that determines capability information indicating any capabilities of the UE for hardware-based self-interference mitigation between at least one transmit chain of the UE and at least one receive chain of the UE.

The apparatus further includes coordination information storage component 1712 that stores coordination information 1718 (e.g., SCS coordination information, beam coordination information, and/or the slot format index coordination information).

The apparatus may include additional components that perform each of the blocks of the algorithm in the aforementioned flowcharts of FIGS. 13-16. As such, each block in the aforementioned flowcharts of FIGS. 13-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
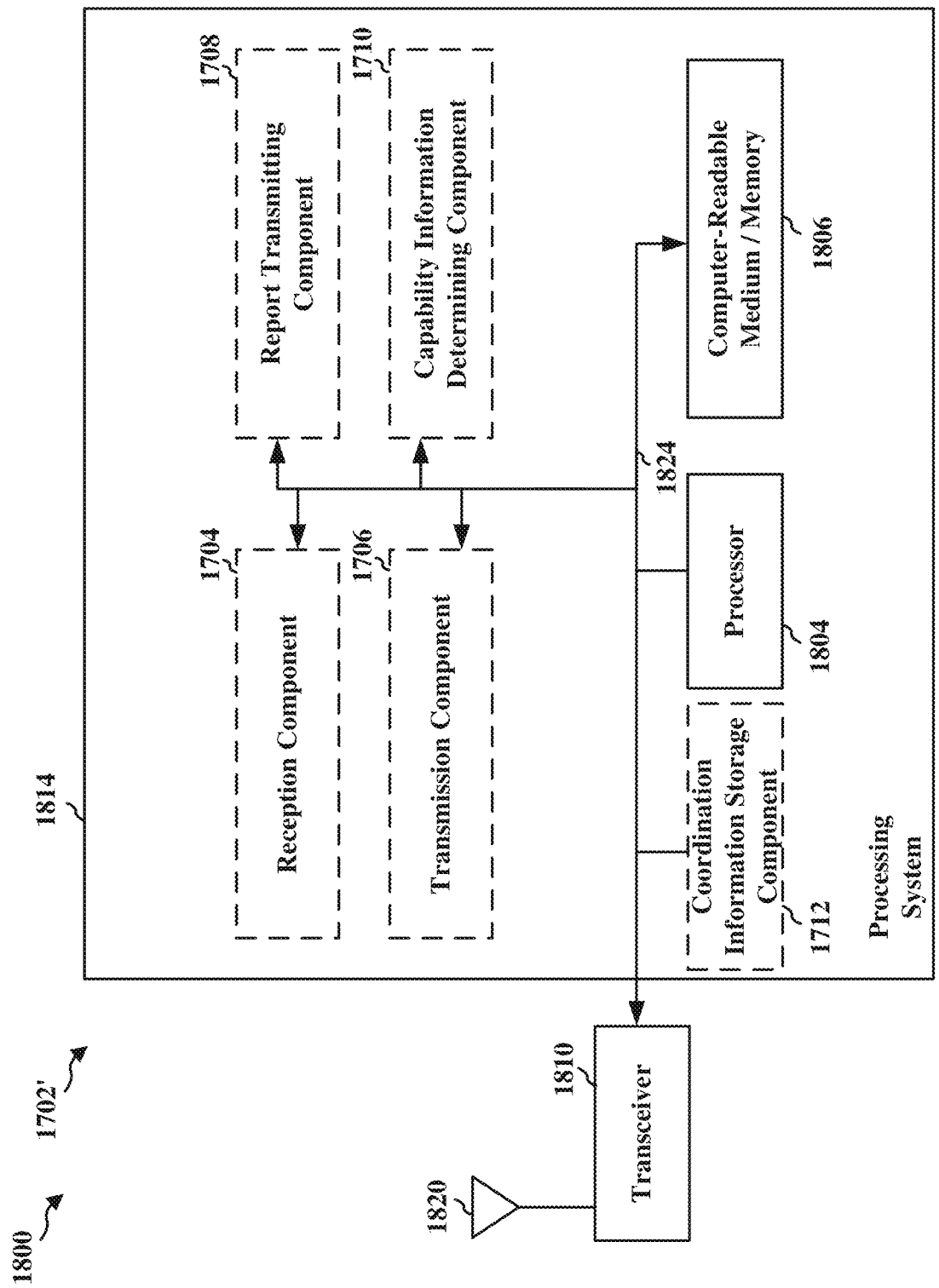
FIG. 18 is a diagram illustrating an example of a hardware implementation for an apparatus employing a processing system in accordance with various aspects of the disclosure.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359. Alternatively, the processing system 1814 may be the entire UE (e.g., see 350 of FIG. 3).

In one configuration, the apparatus 1702/1702' for wireless communication includes means for determining capability information indicating any capabilities of the UE for hardware-based self-interference mitigation between at least one transmit chain of the UE and at least one receive chain of the UE, wherein the at least one transmit chain is configured to operate within a first frequency band and the at least one receive chain is configured to operate within a second frequency band, means for transmitting the capability information to a network, means for receiving for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information are configured to mitigate the self-interference between the at least one transmit chain of the apparatus and the at least one receive chain of the apparatus, means for transmitting a first signal while receiving a second signal based on at least the subcarrier spacing coordination information, the beam coordination information, or the slot format index coordination information, means for receiving, at the apparatus (e.g., a UE) configured for full-duplex communication, subcarrier spacing (SCS) coordination information, the SCS coordination information including a first subcarrier spacing (SCS) configuration for a first frequency band allocated for signal transmissions from the apparatus, and a second SCS configuration for a second frequency band allocated for signal receptions at the apparatus, wherein the first and second frequency bands are nonoverlapping, means for transmitting a first signal based on the first SCS configuration while receiving a second signal based on the second SCS configuration, wherein the first SCS configuration and the second SCS configuration mitigate interference between the first and second signals, means for transmitting a report indicating a quality of one or more downlink signals received at the UE, wherein the interference statistics are based on the report.

The apparatus 1702/1702' for wireless communication further includes means for receiving at least one of beam coordination information for a first beam in a first frequency band and for a second beam in a second frequency band, and slot format index coordination information for the first and second frequency bands. The beam coordination information indicates that the second beam is to be formed based on a configuration of the first beam to mitigate interference between the first and second beams. The slot format index coordination information indicates a first slot format index for the first frequency band and a second slot format index for the second frequency band, wherein the first and second slot format indices are configured to mitigate the interference between the first and second beams. The apparatus 1702/1702' for wireless communication further includes means for transmitting with the first beam while receiving with the second beam based on at least the beam coordination information or the slot format index coordination information.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 19:
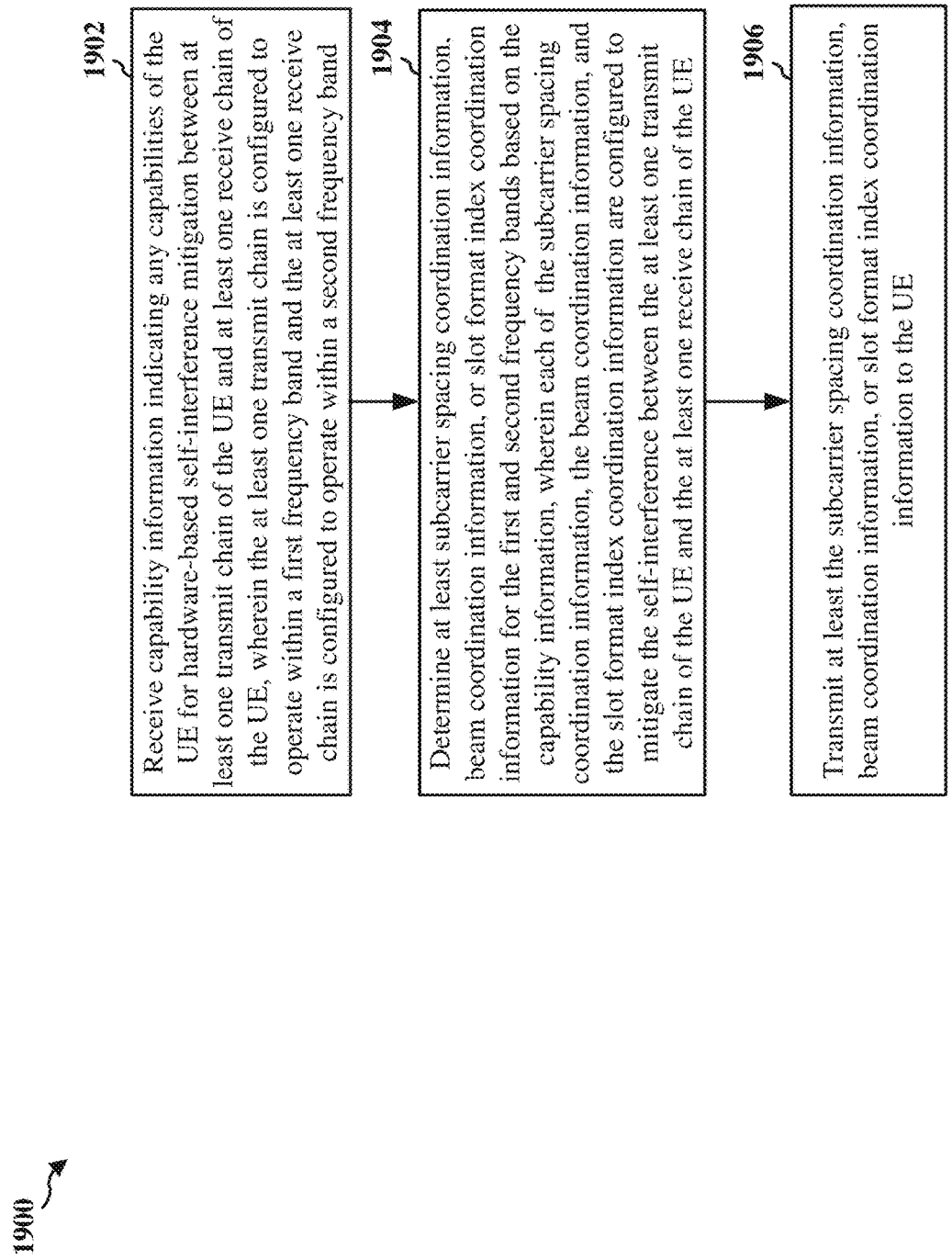
FIG. 19 is a flowchart of a method of wireless communication in accordance with various aspects of the disclosure.

FIG. 19 is a flowchart 1900 of a method of wireless communication. The method may be performed by a base station (e.g., the base station 102, 1004, 1104; the apparatus 2202/2202'; the processing system 2314, which may include the memory 376 and which may be the entire base station 102 or a component of the base station 102, such as the TX processor 316, the RX processor 370, and/or the controller/processor 375).

At 1902, the base station receives, from a UE configured for full-duplex communication, capability information indicating any capabilities of the UE for hardware-based self-interference mitigation between at least one transmit chain of the UE and at least one receive chain of the UE, wherein the at least one transmit chain is configured to operate within a first frequency band and the at least one receive chain is configured to operate within a second frequency band. For example, with reference to FIG. 10, the base station 1004 may receive a message 1008 that includes the capability information from the UE 1002. In some aspects, the capability information indicates at least whether the UE includes one or more circuits (e.g., filter circuit 972, self-interference cancellation circuit 990) to perform the hardware-based self-interference mitigation, whether the UE includes an antenna configured to perform the hardware-based self-interference mitigation, or whether the UE includes a robust power supply decoupling network. In some aspects, the first and second frequency bands are nonoverlapping, and the first frequency band includes a lower range of frequencies than the second frequency band.

At 1904, the base station determines at least subcarrier spacing coordination information, beam coordination information, or slot format index coordination information for the first and second frequency bands based on the capability information, wherein each of the subcarrier spacing coordination information, the beam coordination information, and the slot format index coordination information are configured to mitigate the self-interference between the at least one transmit chain of the UE and the at least one receive chain of the UE. For example, with reference to FIG. 10, the base station 1004 may determine whether the capability information indicates that the capabilities of the UE 1002 for hardware-based self-interference mitigation meet or exceed a threshold. In some examples, the base station 1004 may determine a capability score for the UE 1002 based on the capabilities for hardware-based self-interference mitigation indicated in the capability information, and may determine whether the capability score meets or exceeds the threshold. In these examples, higher scores may represent greater capability for hardware-based self-interference mitigation.

Finally, at 1906, the base station transmits at least the subcarrier spacing coordination information, beam coordination information, or slot format index coordination information to the UE. For example, with reference to FIG. 10, the base station 1004 may transmit the message 1012 that includes coordination information configured to mitigate the self-interference between at least one transmit chain of the UE 1002 and at least one receive chain of the UE 1002. In some aspects, the coordination information may include subcarrier spacing coordination information, beam coordination information, and/or the slot format index coordination information for the first and second frequency bands.

Figure 20:
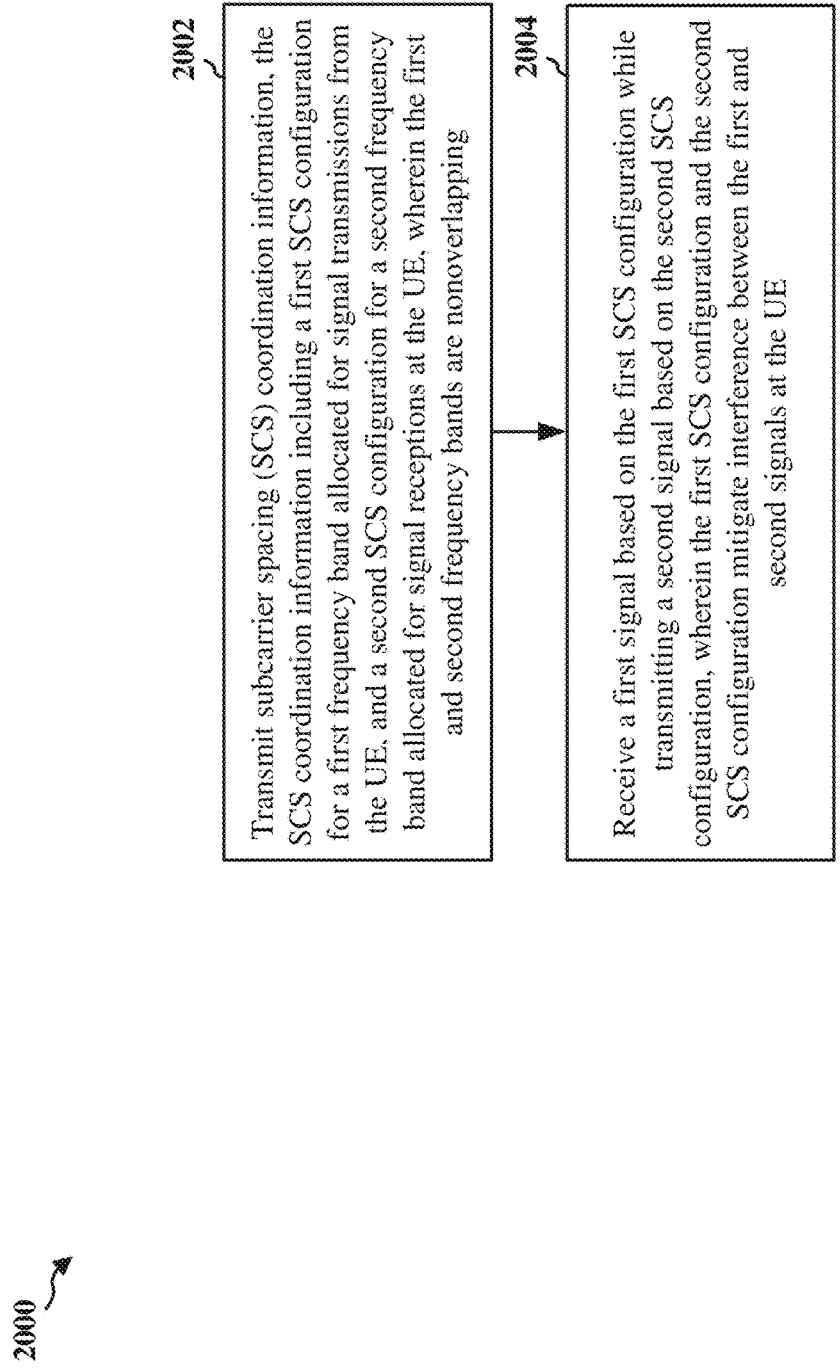
FIG. 20 is a flowchart of a method of wireless communication in accordance with various aspects of the disclosure.

FIG. 20 is a flowchart 2000 of a method of wireless communication. The method may be performed by a base station (e.g., the base station 102, 1004, 1104; the apparatus 2202/2202'; the processing system 2314, which may include the memory 376 and which may be the entire base station 102 or a component of the base station 102, such as the TX processor 316, the RX processor 370, and/or the controller/processor 375).

At 2002, the base station transmits, to a user equipment (UE) configured for full-duplex communication, subcarrier spacing (SCS) coordination information, the SCS coordination information including a first subcarrier spacing (SCS) configuration for a first frequency band allocated for signal transmissions from the UE, and a second SCS configuration for a second frequency band allocated for signal receptions at the UE, wherein the first and second frequency bands are nonoverlapping. For example, one of the first and second SCS configurations may have a lower SCS (e.g., a SCS of 120 kHz) and the other of the first and second SCS configurations may have a higher SCS (e.g., a SCS of 240 kHz).

Finally, at 2004, the base station receives a first signal based on the first SCS configuration while transmitting a second signal based on the second SCS configuration, wherein the first SCS configuration and the second SCS configuration mitigate interference between the first and second signals at the UE.

Figure 21:
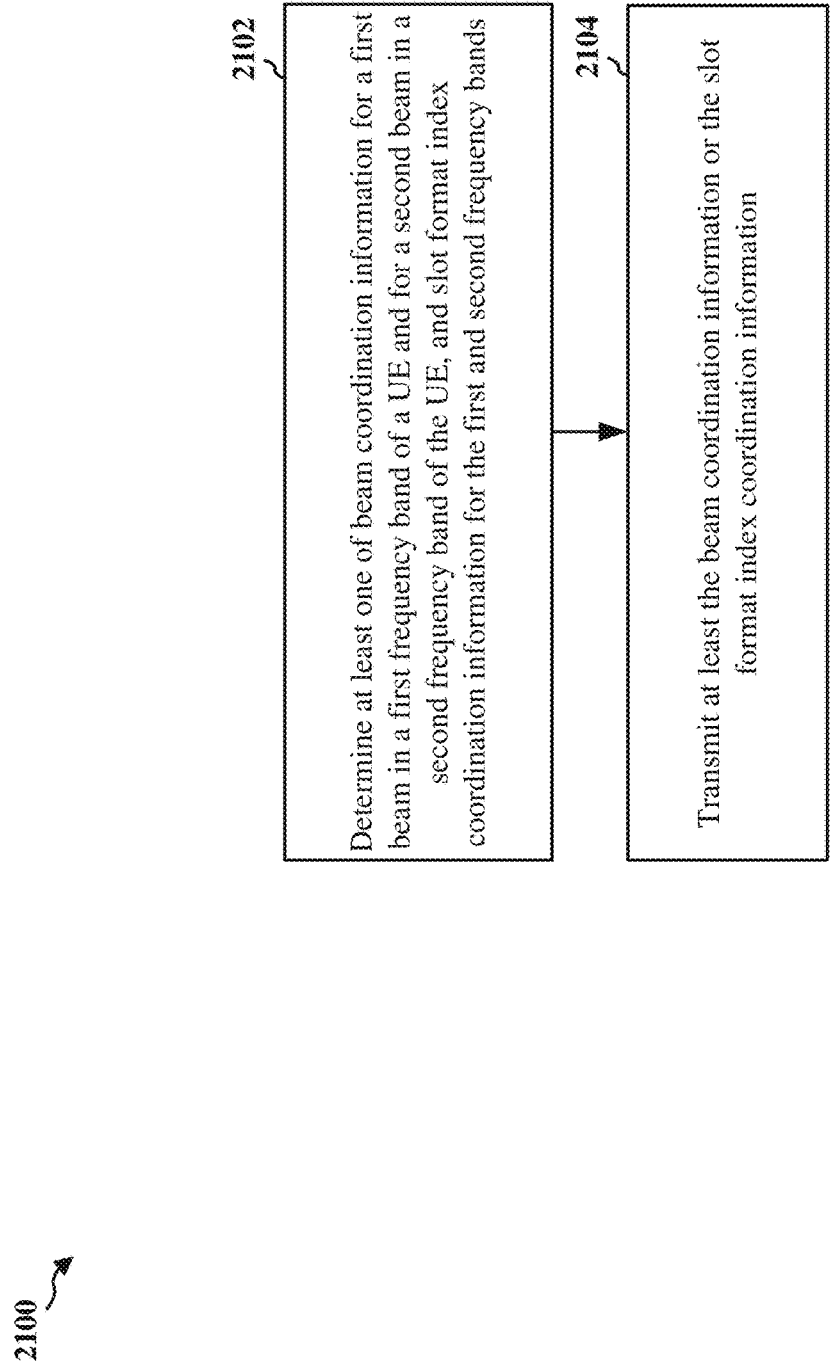
FIG. 21 is a flowchart of a method of wireless communication in accordance with various aspects of the disclosure in accordance with various aspects of the disclosure.

FIG. 21 is a flowchart 2100 of a method of wireless communication. The method may be performed by a base station (e.g., the base station 102, 1004, 1104; the apparatus 2202/2202'; the processing system 2314, which may include the memory 376 and which may be the entire base station 102 or a component of the base station 102, such as the TX processor 316, the RX processor 370, and/or the controller/processor 375).

At 2102, the base station determines at least one of beam coordination information for a first beam in a first frequency band of a UE and for a second beam in a second frequency band of the UE, and slot format index coordination information for the first and second frequency bands. The beam coordination information indicates that the second beam is to be formed at the UE based on a configuration of the first beam to mitigate interference between the first and second beams of the UE. The first and second slot format indices are configured to mitigate the interference between the first and second beams of the UE.

In some aspects, the beam coordination information further indicates whether the second beam is to be configured as an uplink (UL) beam or a downlink (DL) beam. In some aspects, the beam coordination information indicating whether the second beam is to be configured as an uplink (UL) beam or a downlink (DL) beam is based on one or more signal measurements. For example, the one or more signal measurements may include at least a reference signal received power (RSRP), an angle of departure (AoD), an angle of arrival (AoA), a delay spread, or a signal quality report from the UE.

In some aspects, the beam coordination information indicating whether the second beam is to be configured as an uplink (UL) beam or a downlink (DL) beam is based on at least a channel structure, a data rate, a channel diversity, a power consideration, or a thermal consideration. In some aspects, the channel structure is defined by at least a number of clusters in a network, one or more directions of the clusters in the network, or an angular spread value. In some aspects, the configuration of the first beam includes at least a direction of the first beam.

In some aspects, the first frequency band includes a lower frequency range than the second frequency band. In some aspects, the first slot format index and the second slot format index are selected to provide more transmission opportunities than reception opportunities, or to provide more of the reception opportunities than the transmission opportunities.

In some aspects, the first slot format index and the second slot format index are selected based on a preferred list of slot format indices for the UE, a complementary non-preferred list of slot format indices for the UE, or a prioritized list of slot format indices for the UE. In some aspects, the first slot format and the second slot format are selected based on one or more channel types to be transmitted in overlapping symbols of the first and second slot format indices, wherein the one or more channel types includes at least a control channel or a data channel.

Finally, at 2104, the base station transmits, to the UE, at least the beam coordination information or the slot format index coordination information.

Figure 22:
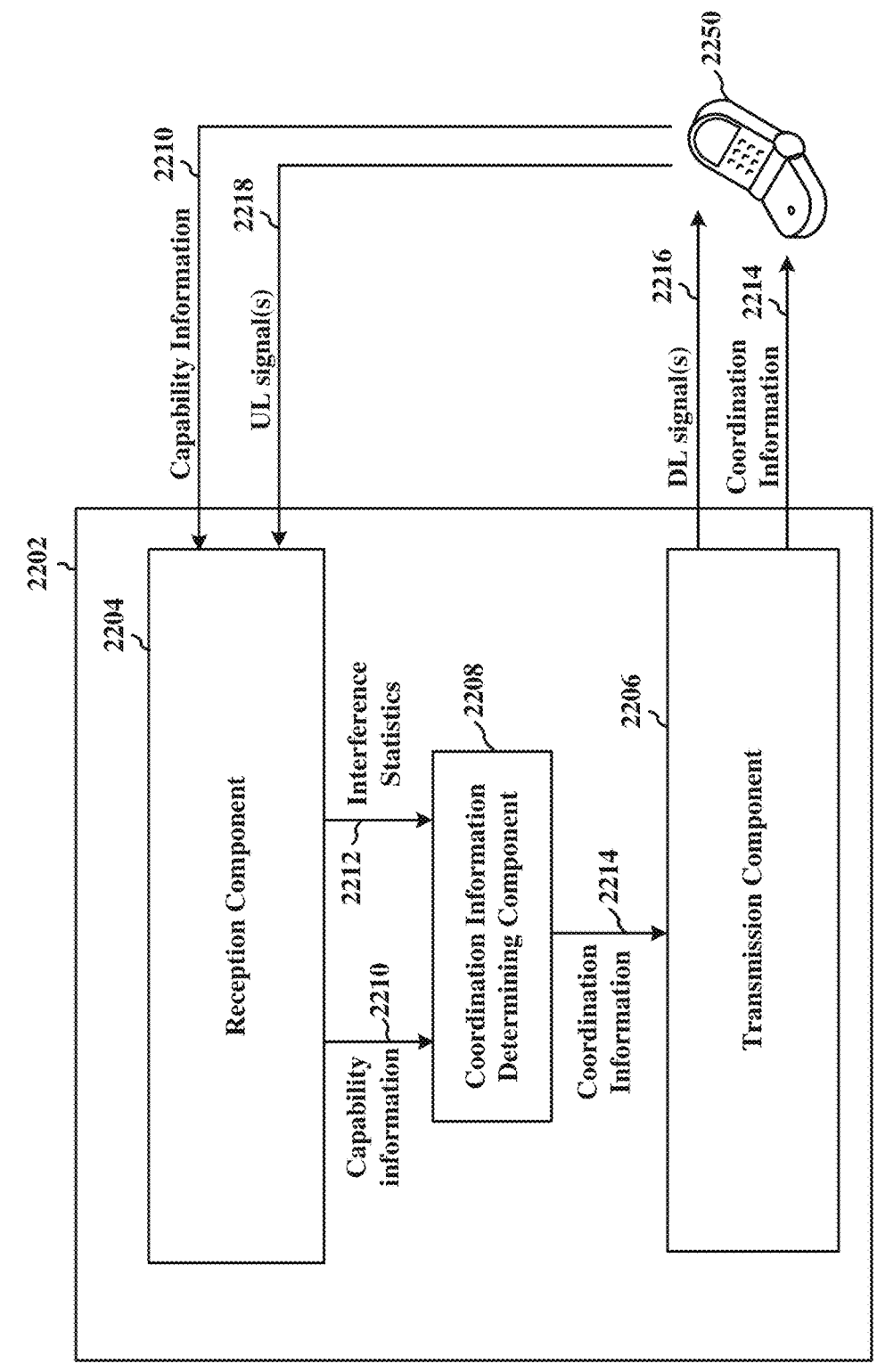
FIG. 22 is a conceptual data flow diagram illustrating the data flow between different means/components in an example apparatus in accordance with various aspects of the disclosure.

FIG. 22 is a conceptual data flow diagram 2200 illustrating the data flow between different means/components in an example apparatus 2202. The apparatus may be a base station. The apparatus includes a reception component 2204 that receives, from a UE 2250 configured for full-duplex communication, capability information 2210 indicating any capabilities of the UE 2250 for hardware-based self-interference mitigation between at least one transmit chain of the UE 2250 and at least one receive chain of the UE 2250, wherein the at least one transmit chain is configured to operate within a first frequency band (e.g., FR2) and the at least one receive chain is configured to operate within a second frequency band (e.g., FR4). The reception component 2204 further receives a first signal (e.g., UL signal 2218) based on the first SCS configuration while transmitting a second signal (e.g., DL signal 2216) based on the second SCS configuration, wherein the first SCS configuration and the second SCS configuration mitigate interference between the first and second signals at the UE 2250.

The apparatus further includes a transmission component 2206 that transmits coordination information 2214 including at least subcarrier spacing (SCS) coordination information, beam coordination information, or slot format index coordination information to the UE 2250. The SCS coordination information may include a first SCS configuration for a first frequency band allocated for signal transmissions from the UE 2250, and a second SCS configuration for a second frequency band allocated for signal receptions at the UE 2250, wherein the first and second frequency bands are nonoverlapping.

The apparatus further includes a coordination information determining component 2208 that determines the coordination information 2014 based on the capability information 2210 and/or interference statistics 2212. The coordination information 2214 may include at least subcarrier spacing coordination information, beam coordination information, or slot format index coordination information for the first and second frequency bands of the UE 2250 configured for full-duplex communication. Each of the subcarrier spacing coordination information, the beam coordination information, and the slot format index coordination information are configured to mitigate the self-interference between the at least one transmit chain of the UE 2250 and the at least one receive chain of the UE 2250. The coordination information determining component 2208 may determine at least one of beam coordination information for a first beam in a first frequency band of a UE and for a second beam in a second frequency band of the UE, and slot format index coordination information for the first and second frequency bands.

The apparatus may include additional components that perform each of the blocks of the algorithm in the aforementioned flowcharts of FIGS. 19-21. As such, each block in the aforementioned flowcharts of FIGS. 19-21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
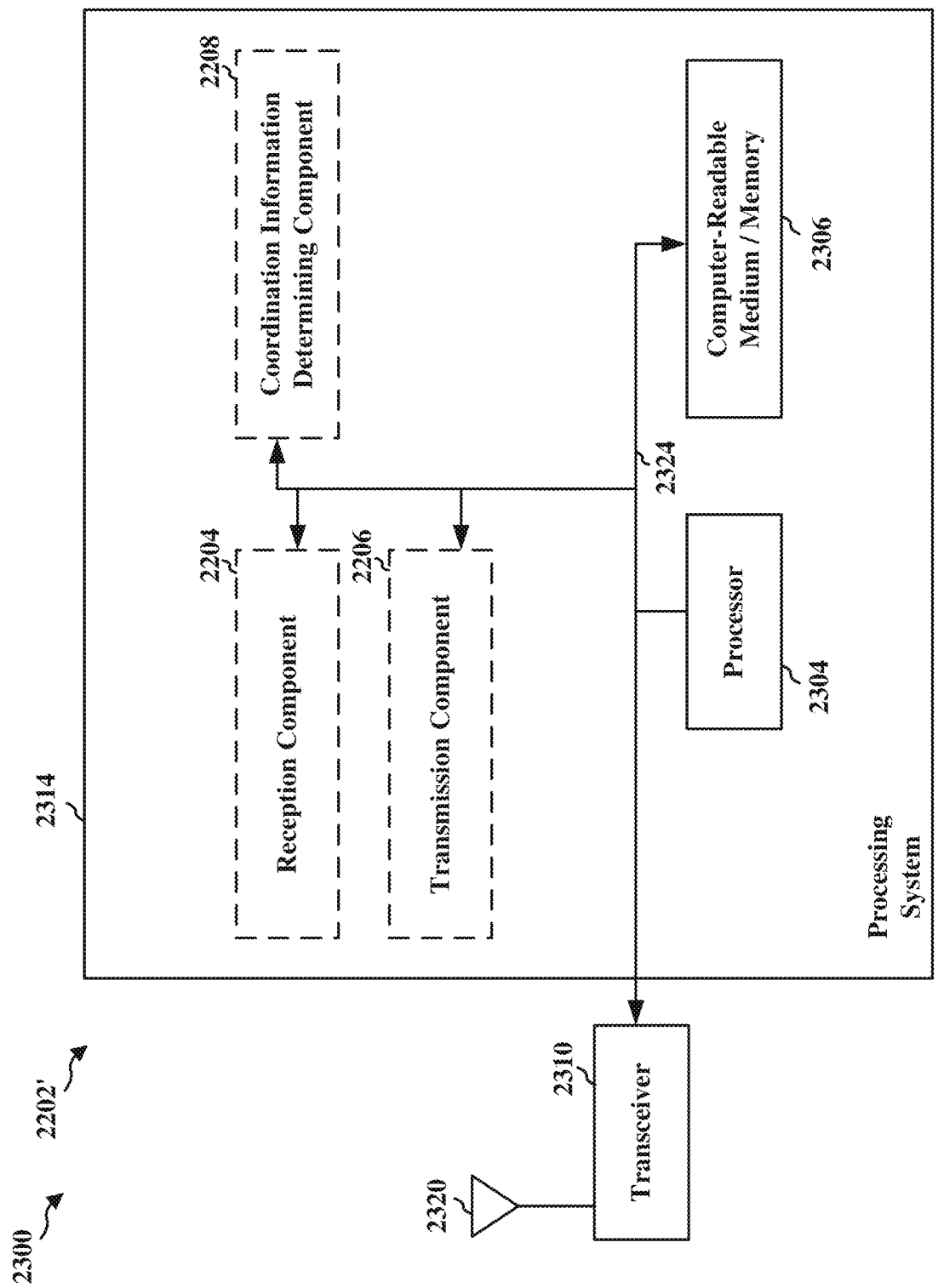
FIG. 23 is a diagram illustrating an example of a hardware implementation for an apparatus employing a processing system in accordance with various aspects of the disclosure.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2206, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208. The components may be software components running in the processor 2304, resident/stored in the computer readable medium/memory 2306, one or more hardware components coupled to the processor 2304, or some combination thereof. The processing system 2314 may be a component of the base station 310 and may include the memory 376 and/or at least one of the TX processor 316, the RX processor 370, and the controller/processor 375. Alternatively, the processing system 2314 may be the entire base station (e.g., see 310 of FIG. 3).

In one configuration, the apparatus 2202/2202' for wireless communication includes means for receiving capability information indicating any capabilities of a UE for hardware-based self-interference mitigation between at least one transmit chain of the UE and at least one receive chain of the UE, wherein the at least one transmit chain is configured to operate within a first frequency band and the at least one receive chain is configured to operate within a second frequency band. The apparatus 2202/2202' for wireless communication further includes means for determining at least subcarrier spacing coordination information, beam coordination information, or slot format index coordination information for the first and second frequency bands based on the capability information, wherein each of the subcarrier spacing coordination information, the beam coordination information, and the slot format index coordination information are configured to mitigate the self-interference between the at least one transmit chain of the UE and the at least one receive chain of the UE.

The apparatus 2202/2202' for wireless communication further includes means for transmitting at least the subcarrier spacing coordination information, beam coordination information, or slot format index coordination information to the UE, means for transmitting subcarrier spacing (SCS) coordination information, the SCS coordination information including a first SCS configuration for a first frequency band allocated for signal transmissions from the UE, and a second SCS configuration for a second frequency band allocated for signal receptions at the UE, wherein the first and second frequency bands are nonoverlapping.

The apparatus 2202/2202' for wireless communication further includes means for receiving a first signal based on the first SCS configuration while transmitting a second signal based on the second SCS configuration, wherein the first SCS configuration and the second SCS configuration mitigate interference between the first and second signals at the UE, means for determining at least one of beam coordination information for a first beam in a first frequency band of the UE and for a second beam in a second frequency band of the UE, and slot format index coordination information for the first and second frequency bands, and means for transmitting at least the beam coordination information or the slot format index coordination information.

The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following provides an overview of aspects of the present disclosure:

Aspect 1: A method of wireless communication at a user equipment (UE) configured for full-duplex communication having at least one transmit chain and at least one receive chain, wherein the at least one transmit chain is configured to operate within a first frequency band and the at least one receive chain is configured to operate within a second frequency band, the method comprising: transmitting capability information to a network, the capability information indicating capabilities of the UE for hardware-based self-interference mitigation between the at least one transmit chain and the at least one receive chain; receiving for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information are configured to mitigate the self-interference between the at least one transmit chain of the UE and the at least one receive chain of the UE; and transmitting a first signal while receiving a second signal based on at least the subcarrier spacing coordination information, the beam coordination information, or the slot format index coordination information.

Aspect 2: The method of aspect 1, wherein the capability information indicates at least one of whether the UE includes one or more circuits to perform the hardware-based self-interference mitigation, whether the UE includes an antenna array configured to perform the hardware-based self-interference mitigation, or whether the UE includes a power supply decoupling network.

Aspect 3: The method of aspect 1 or 2, wherein at least the subcarrier spacing coordination information, the beam coordination information, or the slot format index coordination information is received when the capability information indicates that the capabilities of the UE for hardware-based self-interference mitigation are below a threshold.

Aspect 4: The method of any of aspects 1 through 3, wherein the first and second frequency bands are nonoverlapping, and wherein the first frequency band includes a lower range of frequencies than the second frequency band.

Aspect 5: An apparatus for wireless communication, comprising: a memory; and at least one processor coupled to the memory and configured to perform a method of any one of aspects 1 through 4.

Aspect 6: An apparatus for wireless communication comprising at least one means for performing a method of any one of aspects 1 through 4.

Aspect 7: A computer-readable medium storing computer executable code, the code when executed by a processor cause the processor to perform a method of any one of aspects 1 through 4.

Aspect 8: A method of wireless communication at a user equipment (UE) configured for full-duplex communication, comprising: receiving subcarrier spacing (SCS) coordination information, the SCS coordination information including a first subcarrier spacing (SCS) configuration for a first frequency band allocated for signal transmissions from the UE, and a second SCS configuration for a second frequency band allocated for signal receptions at the UE, wherein the first and second frequency bands are nonoverlapping; and transmitting a first signal based on the first SCS configuration while receiving a second signal based on the second SCS configuration, wherein the first SCS configuration and the second SCS configuration mitigate interference between the first and second signals.

Aspect 9: The method of aspect 8, wherein at least the first SCS configuration or the second SCS configuration is based on interference statistics.

Aspect 10: The method of aspect 9, further comprising: transmitting a report indicating a quality of one or more downlink signals received at the UE, wherein the interference statistics are based on the report.

Aspect 11: The method of any of aspects aspect 8 through 10, wherein one of the first and second SCS configurations has a lower SCS and the other of the first and second SCS configurations has a higher SCS.

Aspect 12: The method of aspect 11, wherein one or more of a first set of symbols in the lower SCS are configured as one of a plurality of symbol types based on one or more constraints, and wherein the first set of symbols are overlapping in a time domain with a second set of symbols in the higher SCS.

Aspect 13: The method of aspect 12, wherein at least one constraint of the one or more constraints ensures that the one or more of the first set of symbols are configured to be a same symbol type as overlapping symbols in the second set of symbols, or that the overlapping set of symbols in the second set of symbols are configured to be the same symbol type as the one or more of the first set of symbols.

Aspect 14: The method of aspect 12 or 13, wherein the plurality of symbol types includes an uplink (UL) symbol, a downlink (DL) symbol, and a flexible (F) symbol.

Aspect 15: The method of any of aspects 12 through 14, wherein at least one constraint of the one or more constraints enables one or more of the first set of symbols to be configured as a different symbol type as overlapping symbols in the second set of symbols when there is no interference between a beam in the first frequency band and a beam in the second frequency band.

Aspect 16: An apparatus for wireless communication, comprising: a memory; and at least one processor coupled to the memory and configured to perform a method of any one of aspects 8 through 15.

Aspect 17: An apparatus for wireless communication comprising at least one means for performing a method of any one of aspects 8 through 15.

Aspect 18: A computer-readable medium storing computer executable code, the code when executed by a processor cause the processor to perform a method of any one of aspects 8 through 15.

Aspect 19: A method of wireless communication at a user equipment (UE) configured for full-duplex communication, comprising: receiving at least one of beam coordination information for a first beam in a first frequency band and for a second beam in a second frequency band, the first and second frequency bands being nonoverlapping, wherein the beam coordination information indicates that the second beam is to be formed based on a configuration of the first beam to mitigate interference between the first and second beams; or slot format index coordination information for the first and second frequency bands, wherein the slot format index coordination information indicates a first slot format index for the first frequency band and a second slot format index for the second frequency band, wherein the first and second slot format indices are configured to mitigate the interference between the first and second beams; and transmitting with the first beam while receiving with the second beam based on at least the beam coordination information or the slot format index coordination information.

Aspect 20: The method of aspect 19, wherein the beam coordination information further indicates whether the second beam is to be configured as an uplink (UL) beam or a downlink (DL) beam.

Aspect 21: The method of aspect 19 or 20, wherein the beam coordination information indicating whether the second beam is to be configured as an uplink (UL) beam or a downlink (DL) beam is based on one or more signal measurements.

Aspect 22: The method of aspect 21, wherein the one or more signal measurements includes at least a reference signal received power (RSRP), an angle of departure (AoD), an angle of arrival (AoA), a delay spread, or a signal quality report from the UE.

Aspect 23: The method of any of aspects 19 through 21, wherein the beam coordination information indicating whether the second beam is to be configured as an uplink (UL) beam or a downlink (DL) beam is based on at least a channel structure, a data rate, a channel diversity, a power consideration, or a thermal consideration.

Aspect 24: The method of aspect 23, wherein the channel structure is defined by at least a number of clusters in a network, one or more directions of the clusters in the network, or an angular spread value.

Aspect 25: The method of any of aspects 19 through 24, wherein the configuration of the first beam includes at least a direction of the first beam.

Aspect 26: The method of any of aspects 19 through 25, wherein the first frequency band includes a lower frequency range than the second frequency band.

Aspect 27: The method of any of aspects 19 through 26, wherein the first slot format index and the second slot format index are selected to provide more transmission opportunities than reception opportunities; or provide more of the reception opportunities than the transmission opportunities.

Aspect 28: The method of any of aspects 19 through 27, wherein the first slot format index and the second slot format index are selected based on a preferred list of slot format indices for the UE, a complementary non-preferred list of slot format indices for the UE, or a prioritized list of slot format indices for the UE.

Aspect 29: The method of any of aspects 19 through 28, wherein the first slot format index and the second slot format index are selected based on one or more channel types to be transmitted in overlapping symbols of the first and second slot format indices, wherein the one or more channel types includes at least a control channel or a data channel.

Aspect 30: An apparatus for wireless communication, comprising: a memory; and at least one processor coupled to the memory and configured to perform a method of any one of aspects 19 through 29.

Aspect 31: An apparatus for wireless communication comprising at least one means for performing a method of any one of aspects 19 through 29.

Aspect 32: A computer-readable medium storing computer executable code, the code when executed by a processor cause the processor to perform a method of any one of aspects 19 through 29.

Aspect 33: A method of wireless communication, comprising: receiving, at a base station from a user equipment (UE) configured for full-duplex communication, capability information indicating any capabilities of the UE for hardware-based self-interference mitigation between at least one transmit chain of the UE and at least one receive chain of the UE, wherein the at least one transmit chain is configured to operate within a first frequency band and the at least one receive chain is configured to operate within a second frequency band; determining at least subcarrier spacing coordination information, beam coordination information, or slot format index coordination information for the first and second frequency bands based on the capability information, wherein each of the subcarrier spacing coordination information, the beam coordination information, and the slot format index coordination information are configured to mitigate the self-interference between the at least one transmit chain of the UE and the at least one receive chain of the UE; and transmitting at least the subcarrier spacing coordination information, beam coordination information, or slot format index coordination information to the UE.

Aspect 34: The method of aspect 33, wherein the capability information indicates at least one of whether the UE includes one or more circuits to perform the hardware-based self-interference mitigation, whether the UE includes an antenna array configured to perform the hardware-based self-interference mitigation, or whether the UE includes a power supply decoupling network.

Aspect 35: The method of aspect 33 or 34, wherein at least the subcarrier spacing coordination information, the beam coordination information, or the slot format index coordination information is transmitted when the capability information indicates that the capabilities of the UE for hardware-based self-interference mitigation are below a threshold.

Aspect 36: The method of any of aspects 33 through 35, wherein the first and second frequency bands are nonoverlapping, and wherein the first frequency band includes a lower range of frequencies than the second frequency band.

Aspect 37: An apparatus for wireless communication, comprising: a memory; and at least one processor coupled to the memory and configured to perform a method of any one of aspects 33 through 36.

Aspect 38: An apparatus for wireless communication comprising at least one means for performing a method of any one of aspects 33 through 36.

Aspect 39: A computer-readable medium storing computer executable code, the code when executed by a processor cause the processor to perform a method of any one of aspects 33 through 36.

Aspect 40: A method of wireless communication, comprising: transmitting, to a user equipment (UE) configured for full-duplex communication, subcarrier spacing (SCS) coordination information, the SCS coordination information including a first subcarrier spacing (SCS) configuration for a first frequency band allocated for signal transmissions from the UE, and a second SCS configuration for a second frequency band allocated for signal receptions at the UE, wherein the first and second frequency bands are nonoverlapping; and receiving a first signal based on the first SCS configuration while transmitting a second signal based on the second SCS configuration, wherein the first SCS configuration and the second SCS configuration mitigate interference between the first and second signals at the UE.

Aspect 41: The method of aspect 40, wherein at least the first SCS configuration or the second SCS configuration is based on interference statistics.

Aspect 42: The method of aspect 41, further comprising: receiving a report indicating a quality of one or more downlink signals received at the UE, wherein the interference statistics are based on the report.

Aspect 43: The method of any of aspects aspect 40 through 42, wherein one of the first and second SCS configurations has a lower SCS and the other of the first and second SCS configurations has a higher SCS.

Aspect 44: The method of aspect 43, wherein one or more of a first set of symbols in the lower SCS are configured as one of a plurality of symbol types based on one or more constraints, and wherein the first set of symbols are overlapping in a time domain with a second set of symbols in the higher SCS.

Aspect 45: The method of aspect 44, wherein at least one constraint of the one or more constraints ensures that the one or more of the first set of symbols are configured to be a same symbol type as overlapping symbols in the second set of symbols, or that the overlapping set of symbols in the second set of symbols are configured to be the same symbol type as the one or more of the first set of symbols.

Aspect 46: The method of aspect 44 or 45, wherein the plurality of symbol types includes an uplink (UL) symbol, a downlink (DL) symbol, and a flexible (F) symbol.

Aspect 47: The method of any of aspects 44 through 46, wherein at least one constraint of the one or more constraints enables one or more of the first set of symbols to be configured as a different symbol type as overlapping symbols in the second set of symbols when there is no interference between a beam in the first frequency band and a beam in the second frequency band.

Aspect 48: An apparatus for wireless communication, comprising: a memory; and at least one processor coupled to the memory and configured to perform a method of any one of aspects 40 through 47.

Aspect 49: An apparatus for wireless communication comprising at least one means for performing a method of any one of aspects 40 through 47.

Aspect 50: A computer-readable medium storing computer executable code, the code when executed by a processor cause the processor to perform a method of any one of aspects 40 through 47.

Aspect 51: A method of wireless communication, comprising: determining, for a user equipment (UE) configured for full-duplex communication, at least one of: beam coordination information for a first beam in a first frequency band of the UE and for a second beam in a second frequency band of the UE, the first and second frequency bands being nonoverlapping, wherein the beam coordination information indicates that the second beam is to be formed at the UE based on a configuration of the first beam to mitigate interference between the first and second beams of the UE; and slot format index coordination information for the first and second frequency bands of the UE, wherein the slot format index coordination information indicates a first slot format index for the first frequency band and a second slot format index for the second frequency band, wherein the first and second slot format indices are configured to mitigate the interference between the first and second beams of the UE; and transmitting, to the UE, at least the beam coordination information or the slot format index coordination information.

Aspect 52: The method of aspect 51, wherein the beam coordination information further indicates whether the second beam is to be configured as an uplink (UL) beam or a downlink (DL) beam.

Aspect 53: The method of aspect 51 or 52, wherein the beam coordination information indicating whether the second beam is to be configured as an uplink (UL) beam or a downlink (DL) beam is based on one or more signal measurements.

Aspect 54: The method of aspect 53, wherein the one or more signal measurements includes at least a reference signal received power (RSRP), an angle of departure (AoD), an angle of arrival (AoA), a delay spread, or a signal quality report from the UE.

Aspect 55: The method of any of aspects 51 through 53, wherein the beam coordination information indicating whether the second beam is to be configured as an uplink (UL) beam or a downlink (DL) beam is based on at least a channel structure, a data rate, a channel diversity, a power consideration, or a thermal consideration.

Aspect 56: The method of aspect 55, wherein the channel structure is defined by at least a number of clusters in a network, one or more directions of the clusters in the network, or an angular spread value.

Aspect 57: The method of any of aspects 51 through 56, wherein the configuration of the first beam includes at least a direction of the first beam.

Aspect 58: The method of any of aspects 51 through 57, wherein the first frequency band includes a lower frequency range than the second frequency band.

Aspect 59: The method of any of aspects 51 through 58, wherein the first slot format index and the second slot format index are selected to provide more transmission opportunities than reception opportunities; or provide more of the reception opportunities than the transmission opportunities.

Aspect 60: The method of any of aspects 51 through 59, wherein the first slot format index and the second slot format index are selected based on a preferred list of slot format indices for the UE, a complementary non-preferred list of slot format indices for the UE, or a prioritized list of slot format indices for the UE.

Aspect 61: The method of any of aspects 51 through 60, wherein the first slot format index and the second slot format index are selected based on one or more channel types to be transmitted in overlapping symbols of the first and second slot format indices, wherein the one or more channel types includes at least a control channel or a data channel.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) configured for full-duplex communication having at least one transmit chain and at least one receive chain, wherein the at least one transmit chain is configured to operate within a first frequency band and the at least one receive chain is configured to operate within a second frequency band, the method comprising:
    transmitting capability information to a network, the capability information indicating capabilities of the UE for hardware-based self-interference mitigation between the at least one transmit chain and the at least one receive chain;
    receiving for the first frequency band and second frequency band, and based on the capability information, at least one of subcarrier spacing coordination information, beam coordination information, or slot format index coordination information, wherein the received at least one of the subcarrier spacing coordination information, the beam coordination information, or the slot format index coordination information are configured to mitigate the self-interference between the at least one transmit chain of the UE and the at least one receive chain of the UE; and
    transmitting a first signal while receiving a second signal based on at least the subcarrier spacing coordination information, the beam coordination information, or the slot format index coordination information.

2. The method of claim 1, wherein the capability information indicates at least one of:
    whether the UE includes one or more circuits to perform the hardware-based self-interference mitigation, whether the UE includes an antenna array configured to perform the hardware-based self-interference mitigation, or whether the UE includes a power supply decoupling network.

3. The method of claim 1, wherein at least the subcarrier spacing coordination information, the beam coordination information, or the slot format index coordination information is received when the capability information indicates that the capabilities of the UE for hardware-based self-interference mitigation are below a threshold.

4. The method of claim 1, wherein the first and second frequency bands are nonoverlapping, and wherein the first frequency band includes a lower range of frequencies than the second frequency band.

5. A method of wireless communication at a user equipment (UE) configured for full-duplex communication, comprising:

receiving subcarrier spacing (SCS) coordination information, the SCS coordination information including a first subcarrier spacing (SCS) configuration for a first frequency band allocated for signal transmissions from the UE, and a second SCS configuration for a second frequency band allocated for signal receptions at the UE, wherein the first and second frequency bands are nonoverlapping; and transmitting a first signal based on the first SCS configuration while receiving a second signal based on the second SCS configuration, wherein the first SCS configuration and the second SCS configuration mitigate interference between the first and second signals.

6. The method of claim 5, wherein at least the first SCS configuration or the second SCS configuration is based on interference statistics.

7. The method of claim 6, further comprising:

transmitting a report indicating a quality of one or more downlink signals received at the UE, wherein the interference statistics are based on the report.

8. The method of claim 5, wherein one of the first and second SCS configurations has a lower SCS and the other of the first and second SCS configurations has a higher SCS.

9. The method of claim 8, wherein one or more of a first set of symbols in the lower SCS are configured as one of a plurality of symbol types based on one or more constraints, and wherein the first set of symbols are overlapping in a time domain with a second set of symbols in the higher SCS.

10. The method of claim 9, wherein at least one constraint of the one or more constraints ensures that the one or more of the first set of symbols are configured to be a same symbol type as overlapping symbols in the second set of symbols, or that the overlapping set of symbols in the second set of symbols are configured to be the same symbol type as the one or more of the first set of symbols.

11. The method of claim 9, wherein the plurality of symbol types includes an uplink (UL) symbol, a downlink (DL) symbol, and a flexible (F) symbol.

12. The method of claim 9, wherein at least one constraint of the one or more constraints enables one or more of the first set of symbols to be configured as a different symbol type as overlapping symbols in the second set of symbols when there is no interference between a beam in the first frequency band and a beam in the second frequency band.

13. A method of wireless communication at a user equipment (UE) configured for full-duplex communication, comprising:

receiving at least one of:

beam coordination information for a first beam in a first frequency band and for a second beam in a second frequency band, the first and second frequency bands being nonoverlapping, wherein the beam coordination information indicates that the second beam is to be formed based on a configuration of the first beam to mitigate interference between the first and second beams; or slot format index coordination information for the first and second frequency bands, wherein the slot format index coordination information indicates a first slot format index for the first frequency band and a second slot format index for the second frequency band, wherein the first and second slot format indices are configured to mitigate the interference between the first and second beams; and transmitting with the first beam while receiving with the second beam based on at least the beam coordination information or the slot format index coordination information.

14. The method of claim 13, wherein the beam coordination information further indicates whether the second beam is to be configured as an uplink (UL) beam or a downlink (DL) beam.

15. The method of claim 13, wherein the beam coordination information indicating whether the second beam is to be configured as an uplink (UL) beam or a downlink (DL) beam is based on one or more signal measurements.

16. The method of claim 15, wherein the one or more signal measurements includes at least a reference signal received power (RSRP), an angle of departure (AoD), an angle of arrival (AoA), a delay spread, or a signal quality report from the UE.

17. The method of claim 13, wherein the beam coordination information indicating whether the second beam is to be configured as an uplink (UL) beam or a downlink (DL) beam is based on at least a channel structure, a data rate, a channel diversity, a power consideration, or a thermal consideration.

18. The method of claim 17, wherein the channel structure is defined by at least a number of clusters in a network, one or more directions of the clusters in the network, or an angular spread value.

19. The method of claim 13, wherein the configuration of the first beam includes at least a direction of the first beam.

20. The method of claim 13, wherein the first frequency band includes a lower frequency range than the second frequency band.

21. The method of claim 13, wherein the first slot format index and the second slot format index are selected to:

provide more transmission opportunities than reception opportunities; or provide more of the reception opportunities than the transmission opportunities.

22. The method of claim 13, wherein the first slot format index and the second slot format index are selected based on a preferred list of slot format indices for the UE, a complementary non-preferred list of slot format indices for the UE, or a prioritized list of slot format indices for the UE.

23. The method of claim 13, wherein the first slot format index and the second slot format index are selected based on one or more channel types to be transmitted in overlapping symbols of the first and second slot format indices, wherein the one or more channel types includes at least a control channel or a data channel.

24. A method of wireless communication, comprising:
receiving, at a base station from a user equipment (UE) configured for full-duplex communication, capability information indicating any capabilities of the UE for hardware-based self-interference mitigation between at least one transmit chain of the UE and at least one receive chain of the UE, wherein the at least one transmit chain is configured to operate within a first frequency band and the at least one receive chain is configured to operate within a second frequency band;
determining at least subcarrier spacing coordination information, beam coordination information, or slot format index coordination information for the first and second frequency bands based on the capability information, wherein each of the subcarrier spacing coordination information, the beam coordination information, and the slot format index coordination information are configured to mitigate the self-interference between the at least one transmit chain of the UE and the at least one receive chain of the UE; and
transmitting at least the subcarrier spacing coordination information, beam coordination information, or slot format index coordination information to the UE.

25. The method of claim 24, wherein the capability information indicates at least one of whether the UE includes one or more circuits to perform the hardware-based self-interference mitigation, whether the UE includes an antenna array configured to perform the hardware-based self-interference mitigation, or whether the UE includes a power supply decoupling network.

26. The method of claim 24, wherein at least the subcarrier spacing coordination information, the beam coordination information, or the slot format index coordination information is transmitted when the capabilities of the UE for hardware-based self-interference mitigation are below a threshold.

27. The method of claim 24, wherein the first and second frequency bands are nonoverlapping, and wherein the first frequency band includes a lower range of frequencies than the second frequency band.

* * * * *